(12) United States Patent
Das et al.

(10) Patent No.: US 12,683,744 B2
(45) Date of Patent: Jul. 14, 2026

(54) ESTABLISHMENT OF OPERATIONAL PARAMETERS FOR SENSING MEASUREMENT EXCHANGES OF A WLAN SENSING MEASUREMENT SESSION

(71) Applicant: Intel Corporation, Santa Clara, CA (US)

(72) Inventors: Dibakar Das, Hillsboro, OR (US); Cheng Chen, Camas, WA (US); Carlos Cordeiro, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 18/082,752

(22) Filed: Dec. 16, 2022

(65) Prior Publication Data

US 2023/0123619 A1    Apr. 20, 2023

Related U.S. Application Data

(60) Provisional application No. 63/407,314, filed on Sep. 16, 2022.

(51) Int. Cl.
H04L 5/00          (2006.01)
(52) U.S. Cl.
CPC .......... H04L 5/0053 (2013.01); H04L 5/0003 (2013.01)
(58) Field of Classification Search
CPC ............................ H04L 5/0053; H04L 5/0003
See application file for complete search history.

(56) References Cited

U.S. PATENT DOCUMENTS

| | | | | |
|---|---|---|---|---|
| 2023/0138224 A1* | 5/2023 | Sadeghi | ............ | H04W 74/0808 |
| | | | | 370/338 |
| 2023/0396957 A1* | 12/2023 | Chen | ...................... | H04W 4/027 |
| 2024/0023161 A1* | 1/2024 | Jang | ...................... | H04L 5/0053 |
| 2025/0159524 A1* | 5/2025 | Lim | ......................... | H04L 5/00 |

OTHER PUBLICATIONS

"IEEE P802.11bn D1.0", Draft Standard for Information technologyPart 11 Wireless LAN Medium Access ControlMAC and Physical Layer PHY SpecificationsAmendment 6 Enhancements for ultra-highreliability UHR, Aug. 2025, 502 pages.

* cited by examiner

*Primary Examiner* — Duc C Ho
(74) *Attorney, Agent, or Firm* — Schwegman Lundberg & Woessner, P.A.

(57) ABSTRACT

A station (STA) (STA-1) configured for wireless local area network (WLAN) sensing establishes a sensing measurement agreement with another STA STA-2 to perform a sensing measurement setup with the other STA. The sensing measurement setup may comprise an exchange of sensing measurement request and response frames to establish sensing measurement parameters associated with a sensing measurement instance. The Sensing Measurement Setup Request frame and the Sensing Measurement Setup Response frame may be configurable to include a variable length Measurement Sensing Parameters field and a sensing sub-elements field to include one or more of the sensing measurement parameters. The sensing measurement parameters may, for example, comprise one or more of a bandwidth (BW) field, one or more fields for a number of space-time streams (STS) and a number of long-training field (LTF) and LTF repetitions that the STA is capable of transmitting and receiving, and an immediate or delayed feedback reporting field.

20 Claims, 10 Drawing Sheets

BSS

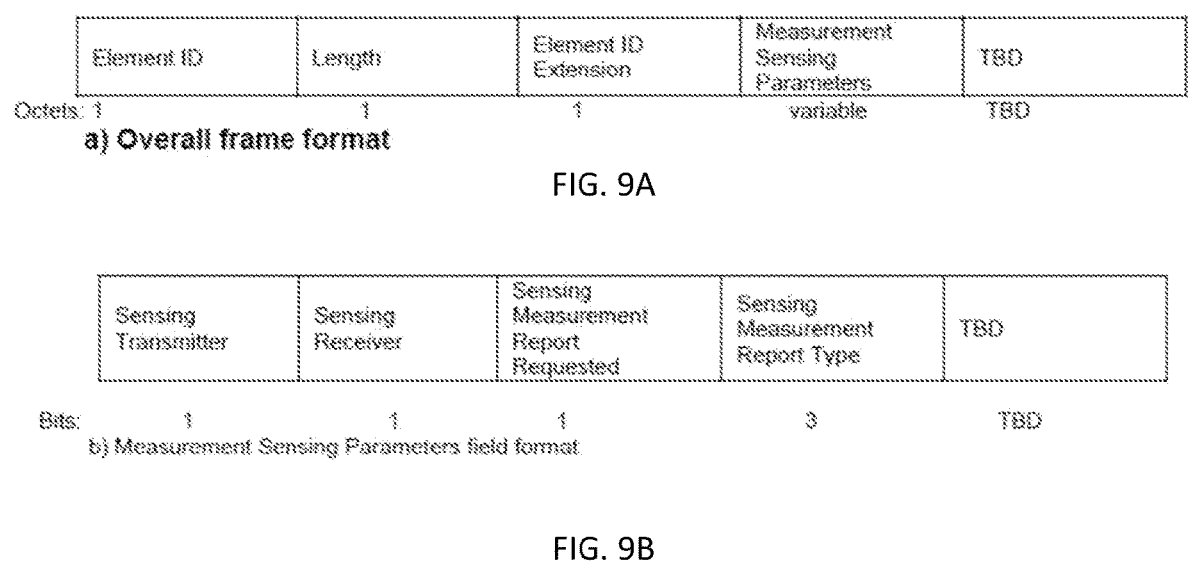

| Element ID | Length | Element ID Extension | Measurement Sensing Parameters | TBD |
|---|---|---|---|---|
| Octets: 1 | 1 | 1 | variable | TBD | a) Overall frame format

FIG. 9A

| Sensing Transmitter | Sensing Receiver | Sensing Measurement Report Requested | Sensing Measurement Report Type | TBD |
|---|---|---|---|---|
| Bits: 1 | 1 | 1 | 3 | TBD | b) Measurement Sensing Parameters field format

FIG. 9B

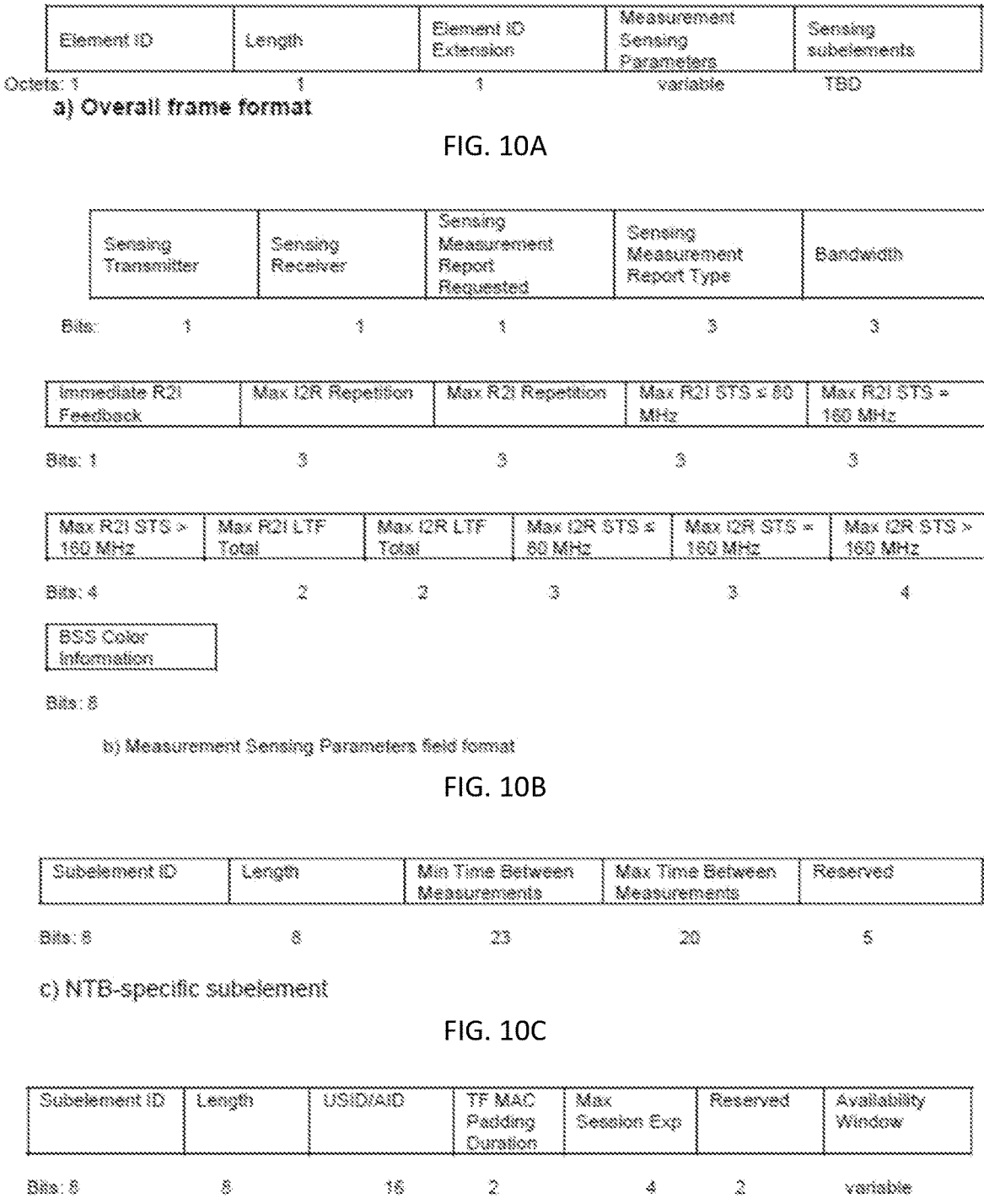

| Element ID | Length | Element ID Extension | Measurement Sensing Parameters | Sensing subelements |
|---|---|---|---|---|
| Octets: 1 | 1 | 1 | variable | TBD | a) Overall frame format

FIG. 10A

| Sensing Transmitter | Sensing Receiver | Sensing Measurement Report Requested | Sensing Measurement Report Type | Bandwidth |
|---|---|---|---|---|
| Bits:   1 | 1 | 1 | 3 | 3 |

| Immediate R2I Feedback | Max I2R Repetition | Max R2I Repetition | Max R2I STS ≤ 80 MHz | Max R2I STS = 160 MHz |
|---|---|---|---|---|
| Bits: 1 | 3 | 3 | 3 | 3 |

| Max R2I STS > 160 MHz | Max R2I LTF Total | Max I2R LTF Total | Max I2R STS ≤ 80 MHz | Max I2R STS = 160 MHz | Max I2R STS > 160 MHz |
|---|---|---|---|---|---|
| Bits: 4 | 2 | 3 | 3 | 3 | 4 |

| BSS Color Information |
|---|
| Bits : 8 | b) Measurement Sensing Parameters field format

FIG. 10B

| Subelement ID | Length | Min Time Between Measurements | Max Time Between Measurements | Reserved |
|---|---|---|---|---|
| Bits : 8 | 8 | 23 | 20 | 5 | c) NTB-specific subelement

FIG. 10C

| Subelement ID | Length | USID/AID | TF MAC Padding Duration | Max Session Exp | Reserved | Availability Window |
|---|---|---|---|---|---|---|
| Bits : 8 | 8 | 16 | 2 | 4 | 2 | variable | d) TB-specific subelement

FIG. 10D

| Sensing Transmitter | Sensing Receiver | Sensing Measurement Report Requested | Sensing Measurement Report Type | Max R2I STS > 160 MHz |
|---|---|---|---|---|

Bits:    1    1    1    3    4

| Max # of Supported R2I EHT-LTFs | Max # of Supported I2R EHT-LTFs | Max I2R STS > 160 MHz |
|---|---|---|

Bits:    5    5    4

FIG. 11

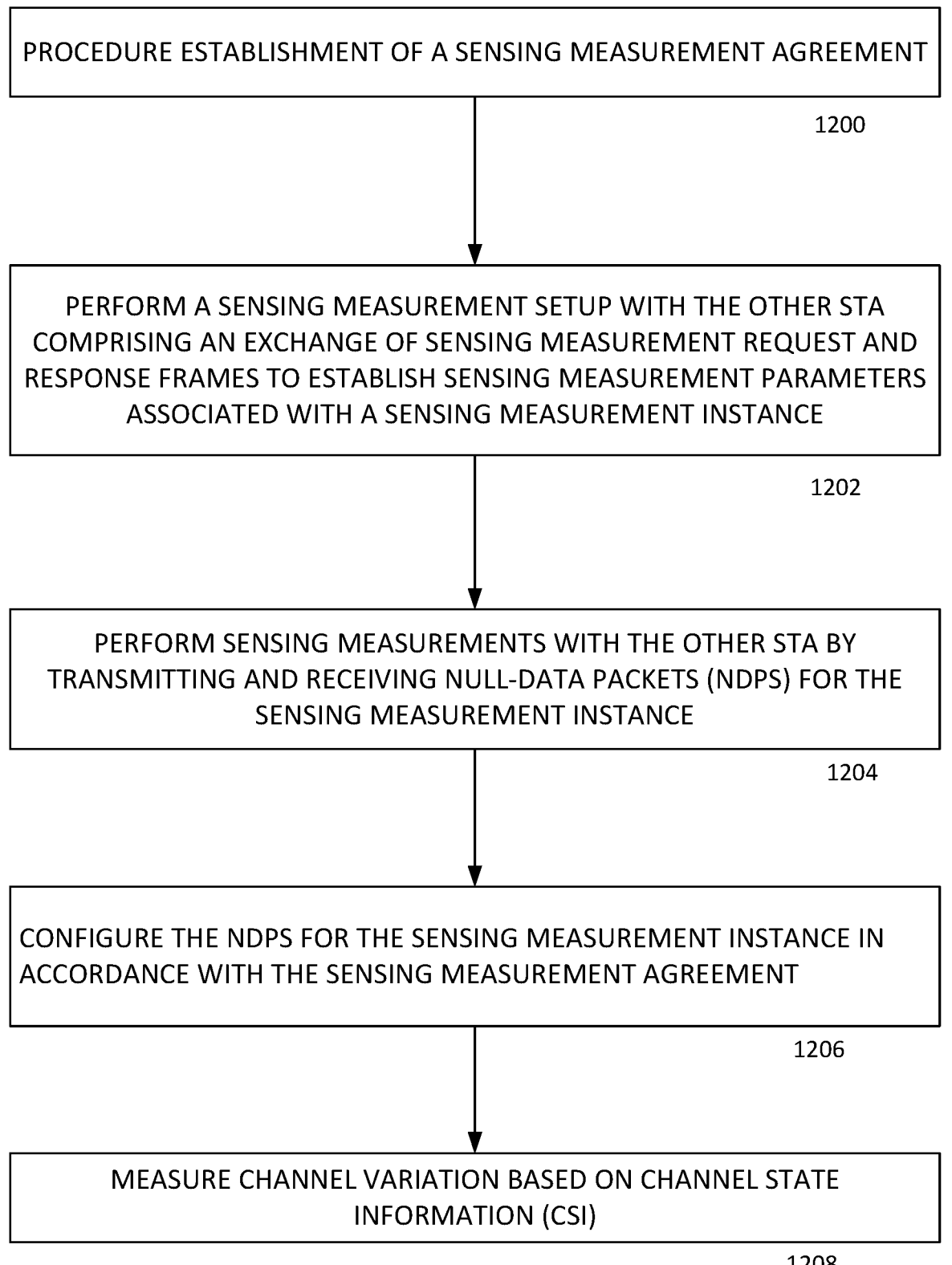

PROCEDURE ESTABLISHMENT OF A SENSING MEASUREMENT AGREEMENT

1200

PERFORM A SENSING MEASUREMENT SETUP WITH THE OTHER STA COMPRISING AN EXCHANGE OF SENSING MEASUREMENT REQUEST AND RESPONSE FRAMES TO ESTABLISH SENSING MEASUREMENT PARAMETERS ASSOCIATED WITH A SENSING MEASUREMENT INSTANCE

1202

PERFORM SENSING MEASUREMENTS WITH THE OTHER STA BY TRANSMITTING AND RECEIVING NULL-DATA PACKETS (NDPS) FOR THE SENSING MEASUREMENT INSTANCE

1204

CONFIGURE THE NDPS FOR THE SENSING MEASUREMENT INSTANCE IN ACCORDANCE WITH THE SENSING MEASUREMENT AGREEMENT

1206

MEASURE CHANNEL VARIATION BASED ON CHANNEL STATE INFORMATION (CSI)

ESTABLISHMENT OF OPERATIONAL PARAMETERS FOR SENSING MEASUREMENT EXCHANGES OF A WLAN SENSING MEASUREMENT SESSION

PRIORITY CLAIM

This application claims priority under 35 U.S.C. 119(e) to U.S. Provisional Patent Application Ser. No. 63/407,314, filed Sep. 16, 2022 [reference number AE9034-Z] which is incorporated herein by reference in its entirety.

TECHNICAL FIELD

Embodiments pertain to wireless communications. Some embodiments pertain to wireless networks including wireless local area networks (WLANs) and Wi-Fi networks including networks operating in accordance with the IEEE 802.11 family of standards. Some embodiments relate to extremely high throughput (EHT) communications. Some embodiments pertain to WLAN sensing in accordance with draft standard IEEE P802.11bf.

BACKGROUND

WLAN sensing is the use of PHY and MAC features of IEEE 802.11 stations to obtain measurements that may be useful to estimate features such as range, velocity, and motion of objects in an area of interest. Measurements obtained with WLAN sensing may be used to enable applications such as presence detection and gesture classification. One issue with WLAN sensing is that for a successful sensing measurement setup, the two peer STAs involved in the setup need to know about each other's MAC and PHY capabilities. Thus what is needed is a procedure for signalling sensing parameter for sensing measurement setup.

BRIEF DESCRIPTION OF THE DRAWINGS

The present disclosure is illustrated by way of example and not limitation in the figures of the accompanying drawings, in which like references indicate similar elements and in which:

FIG. 9A illustrates the overall format of a sensing measurement parameters element, in accordance with some embodiments.

FIG. 9B illustrates a measurement sensing parameters field format of the sensing measurement parameters element, in accordance with some embodiments.

FIG. 10A illustrates the overall format of a sensing measurement parameters element with a sensing sub-elements field, in accordance with some embodiments.

FIG. 10B illustrates a measurement sensing parameters field format of the sensing measurement parameters element with sensing sub-elements, in accordance with some embodiments.

FIG. 10C illustrates a non-trigger based (NTB) specific sub-element, in accordance with some embodiments.

FIG. 10D illustrates a trigger-based (TB) specific sub-element in accordance with some embodiments.

FIG. 11 illustrates an example of a sensing measurement parameters field format to signal operational parameters for 320 MHz using a sensing measurement parameters element in accordance with some embodiments.

FIG. 12 illustrates a procedure for establishment of a sensing measurement agreement with another STA, in accordance with some embodiments.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

In accordance with some embodiments, a station (STA) (STA-1) configured for wireless local area network (WLAN) sensing establishes a sensing measurement agreement with another STA STA-2 to perform a sensing measurement setup with the other STA. The sensing measurement setup may comprise an exchange of sensing measurement request and response frames to establish sensing measurement parameters associated with a sensing measurement instance. The Sensing Measurement Setup Request frame and the Sensing Measurement Setup Response frame may be configurable to include a variable length Measurement Sensing Parameters field and a sensing sub-elements field to include one or more of the sensing measurement parameters. The sensing measurement parameters may, for example, comprise one or more of a bandwidth (BW) field, one or more fields for a number of space-time streams (STS) and a number of long-training field (LTF) and LTF repetitions that the STA is capable of transmitting and receiving, and an immediate or delayed feedback reporting field. These embodiments, as well as others, are discussed in more detail below.

Figures 1, 2:
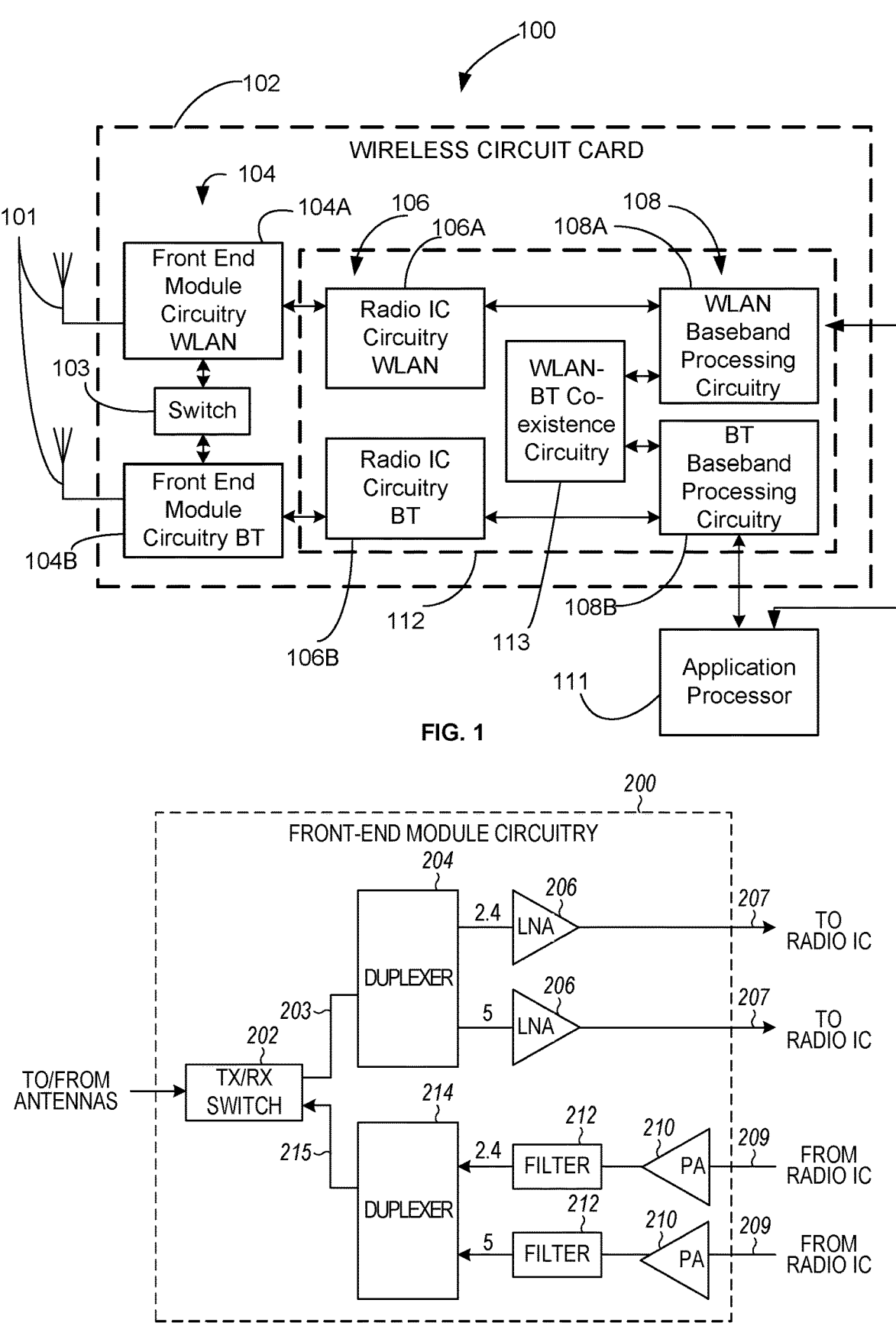
FIG. 1 is a block diagram of a radio architecture in accordance with some embodiments.
FIG. 2 illustrates a front-end module circuitry for use in the radio architecture of FIG. 1 in accordance with some embodiments.

FIG. 1 is a block diagram of a radio architecture 100 in accordance with some embodiments. Radio architecture 100 may include radio front-end module (FEM) circuitry 104, radio IC circuitry 106 and baseband processing circuitry 108. Radio architecture 100 as shown includes both Wireless Local Area Network (WLAN) functionality and Bluetooth (BT) functionality although embodiments are not so limited. In this disclosure, "WLAN" and "Wi-Fi" are used interchangeably.

FEM circuitry 104 may include a WLAN or Wi-Fi FEM circuitry 104A and a Bluetooth (BT) FEM circuitry 104B. The WLAN FEM circuitry 104A may include a receive signal path comprising circuitry configured to operate on WLAN RF signals received from one or more antennas 101, to amplify the received signals and to provide the amplified versions of the received signals to the WLAN radio IC circuitry 106A for further processing. The BT FEM circuitry 104B may include a receive signal path which may include circuitry configured to operate on BT RF signals received from one or more antennas 101, to amplify the received signals and to provide the amplified versions of the received signals to the BT radio IC circuitry 106B for further processing. FEM circuitry 104A may also include a transmit signal path which may include circuitry configured to amplify WLAN signals provided by the radio IC circuitry 106A for wireless transmission by one or more of the antennas 101. In addition, FEM circuitry 104B may also include a transmit signal path which may include circuitry configured to amplify BT signals provided by the radio IC circuitry 106B for wireless transmission by the one or more antennas. In the embodiment of FIG. 1, although FEM 104A and FEM 104B are shown as being distinct from one another, embodiments are not so limited, and include within their scope the use of an FEM (not shown) that includes a transmit path and/or a receive path for both WLAN and BT signals, or the use of one or more FEM circuitries where at least some of the FEM circuitries share transmit and/or receive signal paths for both WLAN and BT signals.

Radio IC circuitry 106 as shown may include WLAN radio IC circuitry 106A and BT radio IC circuitry 106B. The WLAN radio IC circuitry 106A may include a receive signal path which may include circuitry to down-convert WLAN RF signals received from the FEM circuitry 104A and provide baseband signals to WLAN baseband processing circuitry 108A. BT radio IC circuitry 106B may in turn include a receive signal path which may include circuitry to down-convert BT RF signals received from the FEM circuitry 104B and provide baseband signals to BT baseband processing circuitry 108B. WLAN radio IC circuitry 106A may also include a transmit signal path which may include circuitry to up-convert WLAN baseband signals provided by the WLAN baseband processing circuitry 108A and provide WLAN RF output signals to the FEM circuitry 104A for subsequent wireless transmission by the one or more antennas 101. BT radio IC circuitry 106B may also include a transmit signal path which may include circuitry to up-convert BT baseband signals provided by the BT baseband processing circuitry 108B and provide BT RF output signals to the FEM circuitry 104B for subsequent wireless transmission by the one or more antennas 101. In the embodiment of FIG. 1, although radio IC circuitries 106A and 106B are shown as being distinct from one another, embodiments are not so limited, and include within their scope the use of a radio IC circuitry (not shown) that includes a transmit signal path and/or a receive signal path for both WLAN and BT signals, or the use of one or more radio IC circuitries where at least some of the radio IC circuitries share transmit and/or receive signal paths for both WLAN and BT signals.

Baseband processing circuitry 108 may include a WLAN baseband processing circuitry 108A and a BT baseband processing circuitry 108B. The WLAN baseband processing circuitry 108A may include a memory, such as, for example, a set of RAM arrays in a Fast Fourier Transform or Inverse Fast Fourier Transform block (not shown) of the WLAN baseband processing circuitry 108A. Each of the WLAN baseband circuitry 108A and the BT baseband circuitry 108B may further include one or more processors and control logic to process the signals received from the corresponding WLAN or BT receive signal path of the radio IC circuitry 106, and to also generate corresponding WLAN or BT baseband signals for the transmit signal path of the radio IC circuitry 106. Each of the baseband processing circuitries

108A and 108B may further include physical layer (PHY) and medium access control layer (MAC) circuitry, and may further interface with application processor 111 for generation and processing of the baseband signals and for controlling operations of the radio IC circuitry 106.

Referring still to FIG. 1, according to the shown embodiment, WLAN-BT coexistence circuitry 113 may include logic providing an interface between the WLAN baseband circuitry 108A and the BT baseband circuitry 108B to enable use cases requiring WLAN and BT coexistence. In addition, a switch 103 may be provided between the WLAN FEM circuitry 104A and the BT FEM circuitry 104B to allow switching between the WLAN and BT radios according to application needs. In addition, although the antennas 101 are depicted as being respectively connected to the WLAN FEM circuitry 104A and the BT FEM circuitry 104B, embodiments include within their scope the sharing of one or more antennas as between the WLAN and BT FEMs, or the provision of more than one antenna connected to each of FEM 104A or 104B.

In some embodiments, the front-end module circuitry 104, the radio IC circuitry 106, and baseband processing circuitry 108 may be provided on a single radio card, such as wireless radio card 102. In some other embodiments, the one or more antennas 101, the FEM circuitry 104 and the radio IC circuitry 106 may be provided on a single radio card. In some other embodiments, the radio IC circuitry 106 and the baseband processing circuitry 108 may be provided on a single chip or IC, such as IC 112.

In some embodiments, the wireless radio card 102 may include a WLAN radio card and may be configured for Wi-Fi communications, although the scope of the embodiments is not limited in this respect. In some of these embodiments, the radio architecture 100 may be configured to receive and transmit orthogonal frequency division multiplexed (OFDM) or orthogonal frequency division multiple access (OFDMA) communication signals over a multicarrier communication channel. The OFDM or OFDMA signals may comprise a plurality of orthogonal subcarriers.

In some of these multicarrier embodiments, radio architecture 100 may be part of a Wi-Fi communication station (STA) such as a wireless access point (AP), a base station or a mobile device including a Wi-Fi device. In some of these embodiments, radio architecture 100 may be configured to transmit and receive signals in accordance with specific communication standards and/or protocols, such as any of the Institute of Electrical and Electronics Engineers (IEEE) standards including, IEEE 802.11n-2009, IEEE 802.11-2012, IEEE 802.11-2016, IEEE 802.11ac, and/or IEEE 802.11ax standards and/or proposed specifications for WLANs, although the scope of embodiments is not limited in this respect. Radio architecture 100 may also be suitable to transmit and/or receive communications in accordance with other techniques and standards.

In some embodiments, the radio architecture 100 may be configured for high-efficiency (HE) Wi-Fi (HEW) communications in accordance with the IEEE 802.11ax standard. In these embodiments, the radio architecture 100 may be configured to communicate in accordance with an OFDMA technique, although the scope of the embodiments is not limited in this respect.

In some other embodiments, the radio architecture 100 may be configured to transmit and receive signals transmitted using one or more other modulation techniques such as spread spectrum modulation (e.g., direct sequence code division multiple access (DS-CDMA) and/or frequency hopping code division multiple access (FH-CDMA)), time-division multiplexing (TDM) modulation, and/or frequency-division multiplexing (FDM) modulation, although the scope of the embodiments is not limited in this respect.

In some embodiments, as further shown in FIG. 1, the BT baseband circuitry 108B may be compliant with a Bluetooth (BT) connectivity standard such as Bluetooth, Bluetooth 4.0 or Bluetooth 5.0, or any other iteration of the Bluetooth Standard. In embodiments that include BT functionality as shown for example in FIG. 1, the radio architecture 100 may be configured to establish a BT synchronous connection oriented (SCO) link and/or a BT low energy (BT LE) link. In some of the embodiments that include functionality, the radio architecture 100 may be configured to establish an extended SCO (eSCO) link for BT communications, although the scope of the embodiments is not limited in this respect. In some of these embodiments that include a BT functionality, the radio architecture may be configured to engage in a BT Asynchronous Connection-Less (ACL) communications, although the scope of the embodiments is not limited in this respect. In some embodiments, as shown in FIG. 1, the functions of a BT radio card and WLAN radio card may be combined on a single wireless radio card, such as single wireless radio card 102, although embodiments are not so limited, and include within their scope discrete WLAN and BT radio cards In some embodiments, the radio-architecture 100 may include other radio cards, such as a cellular radio card configured for cellular (e.g., 3GPP such as LTE, LTE-Advanced or 5G communications).

In some IEEE 802.11 embodiments, the radio architecture 100 may be configured for communication over various channel bandwidths including bandwidths having center frequencies of about 900 MHz, 2.4 GHz, 5 GHz, and bandwidths of about 1 MHz, 2 MHz, 2.5 MHz, 4 MHz, 5 MHz, 8 MHz, 10 MHz, 16 MHz, 20 MHz, 40 MHz, 80 MHz (with contiguous bandwidths) or 80+80 MHz (160 MHz) (with non-contiguous bandwidths). In some embodiments, a 320 MHz channel bandwidth may be used. The scope of the embodiments is not limited with respect to the above center frequencies however.

FIG. 2 illustrates FEM circuitry 200 in accordance with some embodiments. The FEM circuitry 200 is one example of circuitry that may be suitable for use as the WLAN and/or BT FEM circuitry 104A/104B (FIG. 1), although other circuitry configurations may also be suitable.

In some embodiments, the FEM circuitry 200 may include a TX/RX switch 202 to switch between transmit mode and receive mode operation. The FEM circuitry 200 may include a receive signal path and a transmit signal path. The receive signal path of the FEM circuitry 200 may include a low-noise amplifier (LNA) 206 to amplify received RF signals 203 and provide the amplified received RF signals 207 as an output (e.g., to the radio IC circuitry 106 (FIG. 1)). The transmit signal path of the circuitry 200 may include a power amplifier (PA) to amplify input RF signals 209 (e.g., provided by the radio IC circuitry 106), and one or more filters 212, such as band-pass filters (BPFs), low-pass filters (LPFs) or other types of filters, to generate RF signals 215 for subsequent transmission (e.g., by one or more of the antennas 101 (FIG. 1)).

In some dual-mode embodiments for Wi-Fi communication, the FEM circuitry 200 may be configured to operate in either the 2.4 GHz frequency spectrum or the 5 GHz frequency spectrum. In these embodiments, the receive signal path of the FEM circuitry 200 may include a receive signal path duplexer 204 to separate the signals from each spectrum as well as provide a separate LNA 206 for each spectrum as shown. In these embodiments, the transmit signal path of the FEM circuitry 200 may also include a power amplifier 210 and a filter 212, such as a BPF, a LPF or another type of filter for each frequency spectrum and a transmit signal path duplexer 214 to provide the signals of one of the different spectrums onto a single transmit path for subsequent transmission by the one or more of the antennas 101 (FIG. 1). In some embodiments, BT communications may utilize the 2.4 GHZ signal paths and may utilize the same FEM circuitry 200 as the one used for WLAN communications.

Figure 3:
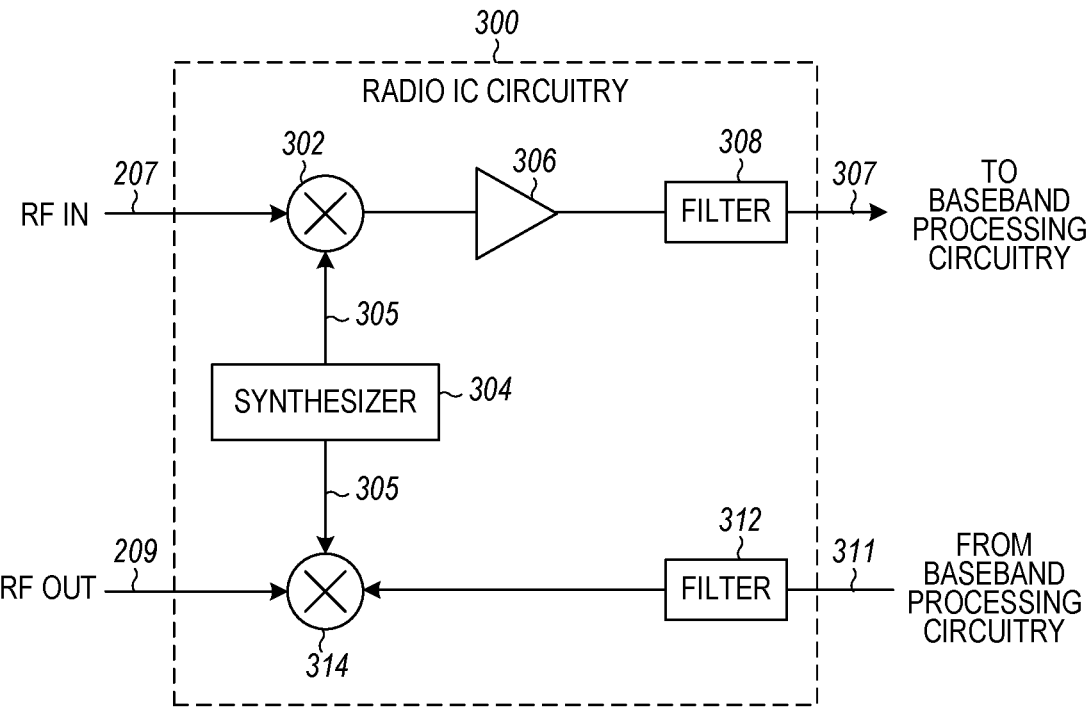
FIG. 3 illustrates a radio IC circuitry for use in the radio architecture of FIG. 1 in accordance with some embodiments.

FIG. 3 illustrates radio integrated circuit (IC) circuitry 300 in accordance with some embodiments. The radio IC circuitry 300 is one example of circuitry that may be suitable for use as the WLAN or BT radio IC circuitry 106A/106B (FIG. 1), although other circuitry configurations may also be suitable.

In some embodiments, the radio IC circuitry 300 may include a receive signal path and a transmit signal path. The receive signal path of the radio IC circuitry 300 may include at least mixer circuitry 302, such as, for example, down-conversion mixer circuitry, amplifier circuitry 306 and filter circuitry 308. The transmit signal path of the radio IC circuitry 300 may include at least filter circuitry 312 and mixer circuitry 314, such as, for example, up-conversion mixer circuitry. Radio IC circuitry 300 may also include synthesizer circuitry 304 for synthesizing a frequency 305 for use by the mixer circuitry 302 and the mixer circuitry 314. The mixer circuitry 302 and/or 314 may each, according to some embodiments, be configured to provide direct conversion functionality. The latter type of circuitry presents a much simpler architecture as compared with standard super-heterodyne mixer circuitries, and any flicker noise brought about by the same may be alleviated for example through the use of OFDM modulation. FIG. 3 illustrates only a simplified version of a radio IC circuitry, and may include, although not shown, embodiments where each of the depicted circuitries may include more than one component. For instance, mixer circuitry 320 and/or 314 may each include one or more mixers, and filter circuitries 308 and/or 312 may each include one or more filters, such as one or more BPFs and/or LPFs according to application needs. For example, when mixer circuitries are of the direct-conversion type, they may each include two or more mixers.

In some embodiments, mixer circuitry 302 may be configured to down-convert RF signals 207 received from the FEM circuitry 104 (FIG. 1) based on the synthesized frequency 305 provided by synthesizer circuitry 304. The amplifier circuitry 306 may be configured to amplify the down-converted signals and the filter circuitry 308 may include a LPF configured to remove unwanted signals from the down-converted signals to generate output baseband signals 307. Output baseband signals 307 may be provided to the baseband processing circuitry 108 (FIG. 1) for further processing. In some embodiments, the output baseband signals 307 may be zero-frequency baseband signals, although this is not a requirement. In some embodiments, mixer circuitry 302 may comprise passive mixers, although the scope of the embodiments is not limited in this respect.

In some embodiments, the mixer circuitry 314 may be configured to up-convert input baseband signals 311 based on the synthesized frequency 305 provided by the synthesizer circuitry 304 to generate RF output signals 209 for the FEM circuitry 104. The baseband signals 311 may be provided by the baseband processing circuitry 108 and may be filtered by filter circuitry 312. The filter circuitry 312 may include a LPF or a BPF, although the scope of the embodiments is not limited in this respect.

In some embodiments, the mixer circuitry 302 and the mixer circuitry 314 may each include two or more mixers and may be arranged for quadrature down-conversion and/or up-conversion respectively with the help of synthesizer 304. In some embodiments, the mixer circuitry 302 and the mixer circuitry 314 may each include two or more mixers each configured for image rejection (e.g., Hartley image rejection). In some embodiments, the mixer circuitry 302 and the mixer circuitry 314 may be arranged for direct down-conversion and/or direct up-conversion, respectively. In some embodiments, the mixer circuitry 302 and the mixer circuitry 314 may be configured for super-heterodyne operation, although this is not a requirement.

Mixer circuitry 302 may comprise, according to one embodiment: quadrature passive mixers (e.g., for the in-phase (I) and quadrature phase (Q) paths). In such an embodiment, RF input signal 207 from FIG. 3 may be down-converted to provide I and Q baseband output signals to be sent to the baseband processor Quadrature passive mixers may be driven by zero and ninety-degree time-varying LO switching signals provided by a quadrature circuitry which may be configured to receive a LO frequency ($f_{LO}$) from a local oscillator or a synthesizer, such as LO frequency 305 of synthesizer 304 (FIG. 3). In some embodiments, the LO frequency may be the carrier frequency, while in other embodiments, the LO frequency may be a fraction of the carrier frequency (e.g., one-half the carrier frequency, one-third the carrier frequency). In some embodiments, the zero and ninety-degree time-varying switching signals may be generated by the synthesizer, although the scope of the embodiments is not limited in this respect.

In some embodiments, the LO signals may differ in duty cycle (the percentage of one period in which the LO signal is high) and/or offset (the difference between start points of the period). In some embodiments, the LO signals may have a 25% duty cycle and a 50% offset. In some embodiments, each branch of the mixer circuitry (e.g., the in-phase (I) and quadrature phase (Q) path) may operate at a 25% duty cycle, which may result in a significant reduction is power consumption.

The RF input signal 207 (FIG. 2) may comprise a balanced signal, although the scope of the embodiments is not limited in this respect. The I and Q baseband output signals may be provided to low-nose amplifier, such as amplifier circuitry 306 (FIG. 3) or to filter circuitry 308 (FIG. 3).

In some embodiments, the output baseband signals 307 and the input baseband signals 311 may be analog baseband signals, although the scope of the embodiments is not limited in this respect. In some alternate embodiments, the output baseband signals 307 and the input baseband signals 311 may be digital baseband signals. In these alternate embodiments, the radio IC circuitry may include analog-to-digital converter (ADC) and digital-to-analog converter (DAC) circuitry.

In some dual-mode embodiments, a separate radio IC circuitry may be provided for processing signals for each spectrum, or for other spectrums not mentioned here, although the scope of the embodiments is not limited in this respect.

In some embodiments, the synthesizer circuitry 304 may be a fractional-N synthesizer or a fractional N/N+1 synthesizer, although the scope of the embodiments is not limited in this respect as other types of frequency synthesizers may be suitable. For example, synthesizer circuitry 304 may be a delta-sigma synthesizer, a frequency multiplier, or a synthesizer comprising a phase-locked loop with a frequency divider. According to some embodiments, the synthesizer circuitry 304 may include digital synthesizer circuitry. An advantage of using a digital synthesizer circuitry is that, although it may still include some analog components, its footprint may be scaled down much more than the footprint of an analog synthesizer circuitry. In some embodiments, frequency input into synthesizer circuitry 304 may be provided by a voltage controlled oscillator (VCO), although that is not a requirement. A divider control input may further be provided by either the baseband processing circuitry 108 (FIG. 1) or the application processor 111 (FIG. 1) depending on the desired output frequency 305. In some embodiments, a divider control input (e.g., N) may be determined from a look-up table (e.g., within a Wi-Fi card) based on a channel number and a channel center frequency as determined or indicated by the application processor 111.

In some embodiments, synthesizer circuitry 304 may be configured to generate a carrier frequency as the output frequency 305, while in other embodiments, the output frequency 305 may be a fraction of the carrier frequency (e.g., one-half the carrier frequency, one-third the carrier frequency). In some embodiments, the output frequency 305 may be a LO frequency ($f_{LO}$).

Figure 4:
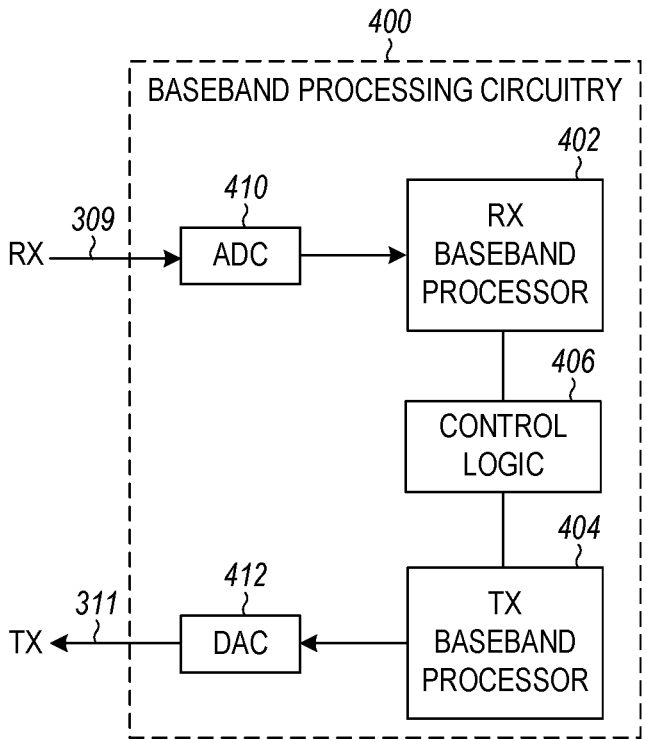
FIG. 4 illustrates a baseband processing circuitry for use in the radio architecture of FIG. 1 in accordance with some embodiments.

FIG. 4 illustrates a functional block diagram of baseband processing circuitry 400 in accordance with some embodiments. The baseband processing circuitry 400 is one example of circuitry that may be suitable for use as the baseband processing circuitry 108 (FIG. 1), although other circuitry configurations may also be suitable. The baseband processing circuitry 400 may include a receive baseband processor (RX BBP) 402 for processing receive baseband signals 309 provided by the radio IC circuitry 106 (FIG. 1) and a transmit baseband processor (TX BBP) 404 for generating transmit baseband signals 311 for the radio IC circuitry 106. The baseband processing circuitry 400 may also include control logic 406 for coordinating the operations of the baseband processing circuitry 400.

In some embodiments (e.g., when analog baseband signals are exchanged between the baseband processing circuitry 400 and the radio IC circuitry 106), the baseband processing circuitry 400 may include ADC 410 to convert analog baseband signals received from the radio IC circuitry 106 to digital baseband signals for processing by the RX BBP 402. In these embodiments, the baseband processing circuitry 400 may also include DAC 412 to convert digital baseband signals from the TX BBP 404 to analog baseband signals.

In some embodiments that communicate OFDM signals or OFDMA signals, such as through baseband processor 108A, the transmit baseband processor 404 may be configured to generate OFDM or OFDMA signals as appropriate for transmission by performing an inverse fast Fourier transform (IFFT). The receive baseband processor 402 may be configured to process received OFDM signals or OFDMA signals by performing an FFT. In some embodiments, the receive baseband processor 402 may be configured to detect the presence of an OFDM signal or OFDMA signal by performing an autocorrelation, to detect a preamble, such as a short preamble, and by performing a cross-correlation, to detect a long preamble. The preambles may be part of a predetermined frame structure for Wi-Fi communication.

Referring to FIG. 1, in some embodiments, the antennas 101 (FIG. 1) may each comprise one or more directional or omnidirectional antennas, including, for example, dipole antennas, monopole antennas, patch antennas, loop antennas, microstrip antennas or other types of antennas suitable for transmission of RF signals. In some multiple-input multiple-output (MIMO) embodiments, the antennas may be effectively separated to take advantage of spatial diversity and the different channel characteristics that may result. Antennas 101 may each include a set of phased-array antennas, although embodiments are not so limited.

Although the radio-architecture 100 is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements may refer to one or more processes operating on one or more processing elements.

Figure 5:
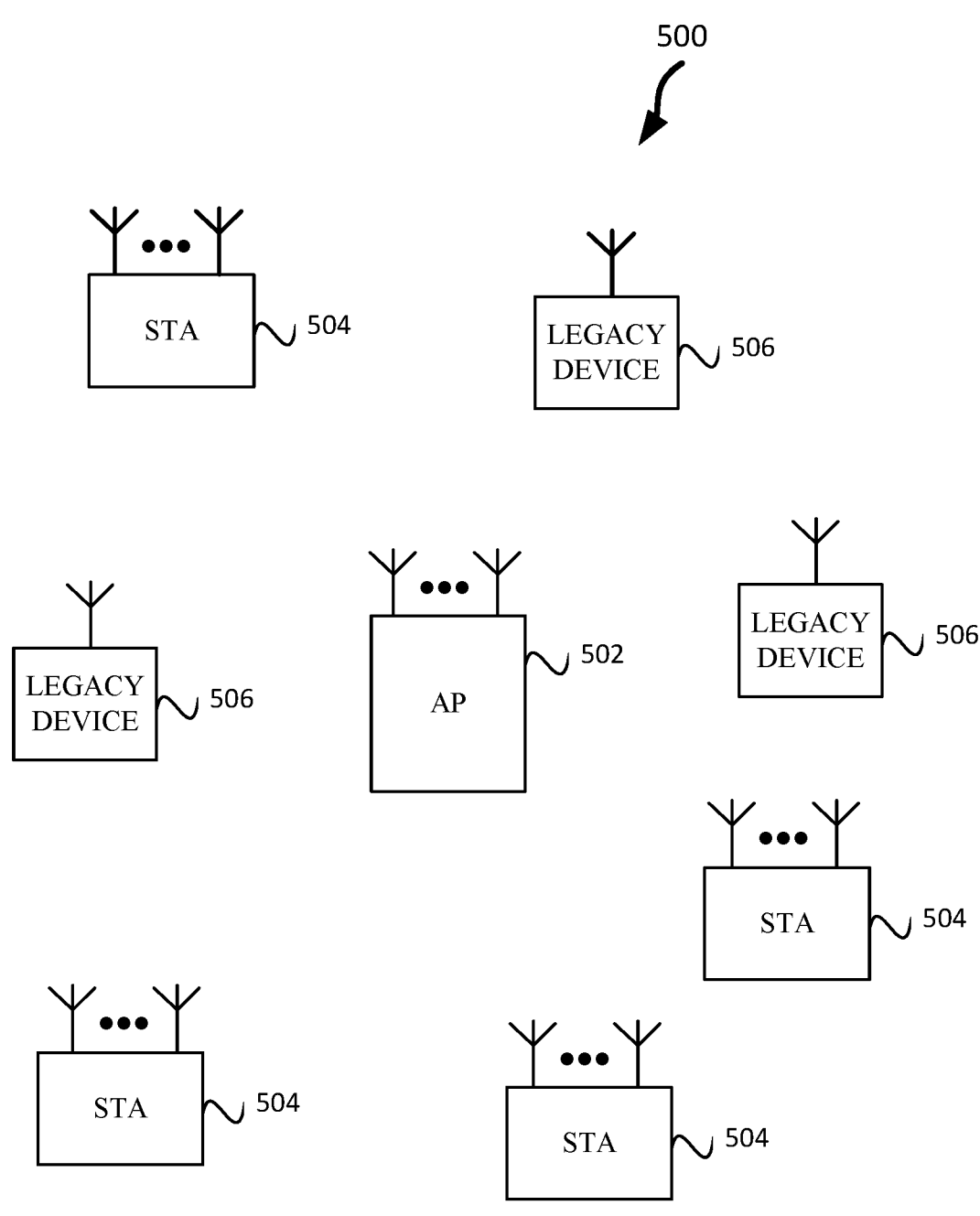
FIG. 5 illustrates a WLAN in accordance with some embodiments.

FIG. 5 illustrates a WLAN 500 in accordance with some embodiments. The WLAN 500 may comprise a basis service set (BSS) that may include an access point (AP) 502, a plurality of stations (STAs) 504, and a plurality of legacy devices 506. In some embodiments, the STAs 504 and/or AP 502 are configured to operate in accordance with IEEE 802.11be extremely high throughput (EHT) and/or high efficiency (HE) IEEE 802.11ax. In some embodiments, the STAs 504 and/or AP 520 are configured to operate in accordance with IEEE 802.11az. In some embodiments, IEEE 802.11EHT may be termed Next Generation 802.11 or a later standard. The STA 504 and AP 502 (or apparatuses of) may be configured to operate in accordance with IEEE P802.11be™/D2.2, October 2022, IEEE P802.11-REVme™/D2.0, October 2022, which are incorporated herein by reference in their entirety. The AP 502 and/or STA 504 may operate in accordance with different versions of the communication standards.

The AP 502 may be an AP using the IEEE 802.11 to transmit and receive. The AP 502 may be a base station. The AP 502 may use other communications protocols as well as the IEEE 802.11 protocol. The EHT protocol may be termed a different name in accordance with some embodiments. The IEEE 802.11 protocol may include using orthogonal frequency division multiple-access (OFDMA), time division multiple access (TDMA), and/or code division multiple access (CDMA). The IEEE 802.11 protocol may include a multiple access technique. For example, the IEEE 802.11 protocol may include space-division multiple access (SDMA) and/or multiple-user multiple-input multiple-output (MU-MIMO). There may be more than one EHT AP 502 that is part of an extended service set (ESS). A controller (not illustrated) may store information that is common to the more than one APs 502 and may control more than one BSS, e.g., assign primary channels, colors, etc. AP 502 may be connected to the internet.

The legacy devices 506 may operate in accordance with one or more of IEEE 802.11 a/b/g/n/ac/ad/af/ah/aj/ay/ax/be, or another legacy wireless communication standard. The legacy devices 506 may be STAs or IEEE STAs. The STAs 504 may be wireless transmit and receive devices such as cellular telephone, portable electronic wireless communication devices, smart telephone, handheld wireless device, wireless glasses, wireless watch, wireless personal device, tablet, or another device that may be transmitting and receiving using the IEEE 802.11 protocol such as IEEE 802.11be or another wireless protocol.

The AP 502 may communicate with legacy devices 506 in accordance with legacy IEEE 802.11 communication techniques. In example embodiments, the H AP 502 may also be configured to communicate with STAs 504 in accordance with legacy IEEE 802.11 communication techniques.

In some embodiments, a HE or EHT frames may be configurable to have the same bandwidth as a channel. The HE or EHT frame may be a physical Layer (PHY) Protocol Data Unit (PPDU). In some embodiments, PPDU may be an abbreviation for physical layer protocol data unit (PPDU). In some embodiments, there may be different types of PPDUs that may have different fields and different physical layers and/or different media access control (MAC) layers. For example, a single user (SU) PPDU, multiple-user (MU) PPDU, extended-range (ER) SU PPDU, and/or trigger-based (TB) PPDU. In some embodiments EHT may be the same or similar as HE PPDUs.

The bandwidth of a channel may be 20 MHz, 40 MHz, or 80 MHz, 80+80 MHz, 160 MHz, 160+160 MHz, 320 MHz, 320+320 MHz, 640 MHz bandwidths. In some embodiments, the bandwidth of a channel less than 20 MHz may be 1 MHz, 1.25 MHz, 2.03 MHz, 2.5 MHz, 4.06 MHz, 5 MHz and 10 MHz, or a combination thereof or another bandwidth that is less or equal to the available bandwidth may also be used. In some embodiments the bandwidth of the channels may be based on a number of active data subcarriers. In some embodiments the bandwidth of the channels is based on 26, 52, 106, 242, 484, 996, or 2×996 active data subcarriers or tones that are spaced by 20 MHz. In some embodiments the bandwidth of the channels is 256 tones spaced by 20 MHz. In some embodiments the channels are multiple of 26 tones or a multiple of 20 MHz. In some embodiments a 20 MHz channel may comprise 242 active data subcarriers or tones, which may determine the size of a Fast Fourier Transform (FFT). An allocation of a bandwidth or a number of tones or sub-carriers may be termed a resource unit (RU) allocation in accordance with some embodiments.

In some embodiments, the 26-subcarrier RU and 52-subcarrier RU are used in the 20 MHz, 40 MHz, 80 MHz, 160 MHz and 80+80 MHz OFDMA HE PPDU formats. In some embodiments, the 106-subcarrier RU is used in the 20 MHz, 40 MHz, 80 MHz, 160 MHz and 80+80 MHz OFDMA and MU-MIMO HE PPDU formats. In some embodiments, the 242-subcarrier RU is used in the 40 MHz, 80 MHz, 160 MHz and 80+80 MHz OFDMA and MU-MIMO HE PPDU formats. In some embodiments, the 484-subcarrier RU is used in the 80 MHz, 160 MHz and 80+80 MHz OFDMA and MU-MIMO HE PPDU formats. In some embodiments, the 996-subcarrier RU is used in the 160 MHz and 80+80 MHz OFDMA and MU-MIMO HE PPDU formats. In some embodiments, two or more of the RUs are joined as an MRU.

A HE or EHT frame may be configured for transmitting a number of spatial streams, which may be in accordance with MU-MIMO and may be in accordance with OFDMA. In other embodiments, the AP 502, STA 504, and/or legacy device 506 may also implement different technologies such as code division multiple access (CDMA) 2000, CDMA 2000 1×, CDMA 2000 Evolution-Data Optimized (EV-DO), Interim Standard 2000 (IS-2000), Interim Standard 95 (IS-95), Interim Standard 856 (IS-856), Long Term Evolution (LTE), Global System for Mobile communications (GSM), Enhanced Data rates for GSM Evolution (EDGE), GSM EDGE (GERAN), IEEE 802.16 (i.e., Worldwide Interoperability for Microwave Access (WiMAX)), BlueTooth®, low-power BlueTooth®, or other technologies.

In accordance with some IEEE 802.11 embodiments, e.g, IEEE 802.11EHT/ax embodiments, a HE AP 502 may operate as a master station which may be arranged to contend for a wireless medium (e.g., during a contention period) to receive exclusive control of the medium for a transmission opportunity (TXOP). The AP 502 may transmit an EHT/HE trigger frame transmission, which may include a schedule for simultaneous UL/DL transmissions from STAs 504. The AP 502 may transmit a time duration of the TXOP and sub-channel information. During the TXOP, STAs 504 may communicate with the AP 502 in accordance with a non-contention based multiple access technique such as OFDMA or MU-MIMO. This is unlike conventional WLAN communications in which devices communicate in accordance with a contention-based communication technique, rather than a multiple access technique. During the HE or EHT control period, the AP 502 may communicate with STAs 504 using one or more HE or EHT frames. During the TXOP, the HE STAs 504 may operate on a sub-channel smaller than the operating range of the AP 502. During the TXOP, legacy stations refrain from communicating. The legacy stations may need to receive the communication from the HE AP 502 to defer from communicating.

In accordance with some embodiments, during the TXOP the STAs 504 may contend for the wireless medium with the legacy devices 506 being excluded from contending for the wireless medium during the master-sync transmission. In some embodiments the trigger frame may indicate an UL-MU-MIMO and/or UL OFDMA TXOP. In some embodiments, the trigger frame may include a DL UL-MU-MIMO and/or DL OFDMA with a schedule indicated in a preamble portion of trigger frame.

In some embodiments, the multiple-access technique used during the HE or EHT TXOP may be a scheduled OFDMA technique, although this is not a requirement. In some embodiments, the multiple access technique may be a time-division multiple access (TDMA) technique or a frequency division multiple access (FDMA) technique. In some embodiments, the multiple access technique may be a space-division multiple access (SDMA) technique. In some embodiments, the multiple access technique may be a Code division multiple access (CDMA).

The AP 502 may also communicate with legacy devices 506 and/or STAs 504 in accordance with legacy IEEE 802.11 communication techniques. In some embodiments, the AP 502 may also be configurable to communicate with STAs 504 outside the TXOP in accordance with legacy IEEE 802.11 or IEEE 802.11EHT/ax communication techniques, although this is not a requirement.

In some embodiments the STA 504 may be a "group owner" (GO) for peer-to-peer modes of operation. A wireless device may be a STA 504 or a HE AP 502.

In some embodiments, the STA 504 and/or AP 502 may be configured to operate in accordance with IEEE 802.11mc. In example embodiments, the radio architecture of FIG. 1 is configured to implement the STA 504 and/or the AP 502. In example embodiments, the front-end module circuitry of FIG. 2 is configured to implement the STA 504 and/or the AP 502. In example embodiments, the radio IC circuitry of FIG. 3 is configured to implement the STA 504 and/or the AP 502. In example embodiments, the base-band processing circuitry of FIG. 4 is configured to implement the STA 504 and/or the AP 502.

In example embodiments, the STAs 504, AP 502, an apparatus of the STA 504, and/or an apparatus of the AP 502 may include one or more of the following: the radio architecture of FIG. 1, the front-end module circuitry of FIG. 2, the radio IC circuitry of FIG. 3, and/or the base-band processing circuitry of FIG. 4.

In example embodiments, the radio architecture of FIG. 1, the front-end module circuitry of FIG. 2, the radio IC circuitry of FIG. 3, and/or the base-band processing circuitry of FIG. 4 may be configured to perform the methods and operations/functions herein described in conjunction with FIGS. 1-12.

In example embodiments, the STAs 504 and/or the HE AP 502 are configured to perform the methods and operations/functions described herein in conjunction with FIGS. 1-12. In example embodiments, an apparatus of the STA 504 and/or an apparatus of the AP 502 are configured to perform the methods and functions described herein in conjunction with FIGS. 1-12. The term Wi-Fi may refer to one or more of the IEEE 802.11 communication standards. AP and STA may refer to EHT/HE access point and/or EHT/HE station as well as legacy devices 506.

In some embodiments, a HE AP STA may refer to an AP 502 and/or STAs 504 that are operating as EHT APs 502. In some embodiments, when a STA 504 is not operating as an AP, it may be referred to as a non-AP STA or non-AP. In some embodiments, STA 504 may be referred to as either an AP STA or a non-AP. In some embodiments, the AP 502 is an AP of the AP MLD 808. In some embodiments, the STA 504 is a STA of non-AP MLD 3 809.

Figure 6:
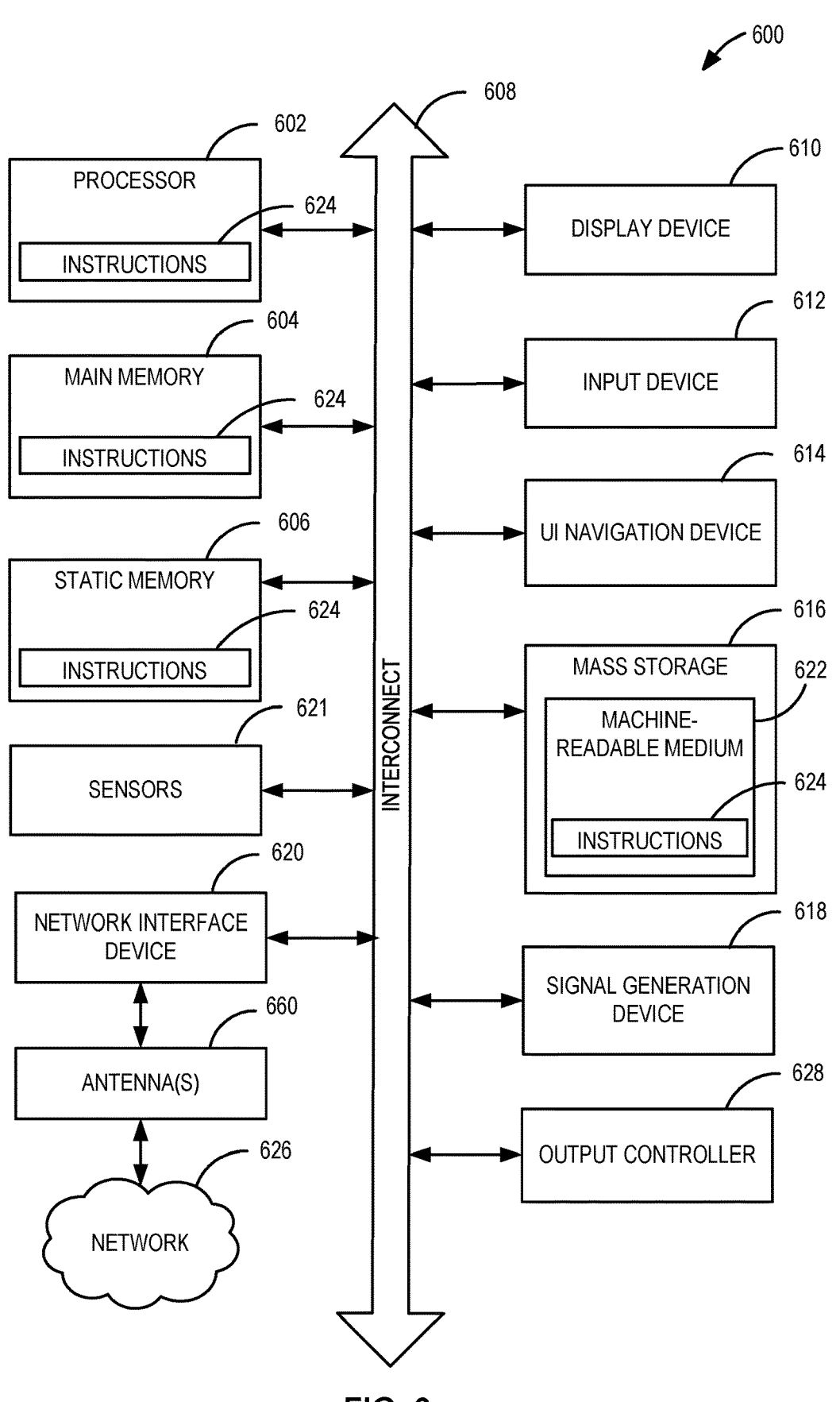
FIG. 6 illustrates a block diagram of an example machine upon which any one or more of the techniques (e.g., methodologies) discussed herein may perform.

FIG. 6 illustrates a block diagram of an example machine 600 upon which any one or more of the techniques (e.g., methodologies) discussed herein may perform. In alternative embodiments, the machine 600 may operate as a standalone device or may be connected (e.g., networked) to other machines. In a networked deployment, the machine 600 may operate in the capacity of a server machine, a client machine, or both in server-client network environments. In an example, the machine 600 may act as a peer machine in peer-to-peer (P2P) (or other distributed) network environment. The machine 600 may be a HE AP 502, EHT station 504, personal computer (PC), a tablet PC, a set-top box (STB), a personal digital assistant (PDA), a portable communications device, a mobile telephone, a smart phone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Machine (e.g., computer system) 600 may include a hardware processor 602 (e.g., a central processing unit (CPU), a graphics processing unit (GPU), a hardware processor core, or any combination thereof), a main memory 604 and a static memory 606, some or all of which may communicate with each other via an interlink (e.g., bus) 608.

Specific examples of main memory 604 include Random Access Memory (RAM), and semiconductor memory devices, which may include, in some embodiments, storage locations in semiconductors such as registers. Specific examples of static memory 606 include non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; RAM; and CD-ROM and DVD-ROM disks.

The machine 600 may further include a display device 610, an input device 612 (e.g., a keyboard), and a user interface (UI) navigation device 614 (e.g., a mouse). In an example, the display device 610, input device 612 and UI navigation device 614 may be a touch screen display. The machine 600 may additionally include a mass storage (e.g., drive unit) 616, a signal generation device 618 (e.g., a speaker), a network interface device 620, and one or more sensors 621, such as a global positioning system (GPS) sensor, compass, accelerometer, or other sensor. The machine 600 may include an output controller 628, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.). In some embodiments the processor 602 and/or instructions 624 may comprise processing circuitry and/or transceiver circuitry.

The mass device 616 may include a machine readable medium 622 on which is stored one or more sets of data structures or instructions 624 (e.g., software) embodying or utilized by any one or more of the techniques or functions described herein. The instructions 624 may also reside, completely or at least partially, within the main memory 604, within static memory 606, or within the hardware processor 602 during execution thereof by the machine 600. In an example, one or any combination of the hardware processor 602, the main memory 604, the static memory 606, or the mass storage 616 may constitute machine readable media.

Specific examples of machine readable media may include: non-volatile memory, such as semiconductor memory devices (e.g., EPROM or EEPROM) and flash memory devices; magnetic disks, such as internal hard disks and removable disks; magneto-optical disks; RAM; and CD-ROM and DVD-ROM disks.

While the machine readable medium 622 is illustrated as a single medium, the term "machine readable medium" may include a single medium or multiple media (e.g., a centralized or distributed database, and/or associated caches and servers) configured to store the one or more instructions 624.

An apparatus of the machine 600 may be one or more of a hardware processor 602 (e.g., a central processing unit (CPU), a graphics processing unit (GPU), a hardware processor core, or any combination thereof), a main memory 604 and a static memory 606, sensors 621, network interface device 620, antennas 660, a display device 610, an input device 612, a UI navigation device 614, a mass storage 616, instructions 624, a signal generation device 618, and an output controller 628. The apparatus may be configured to perform one or more of the methods and/or operations disclosed herein. The apparatus may be intended as a component of the machine 600 to perform one or more of the methods and/or operations disclosed herein, and/or to perform a portion of one or more of the methods and/or operations disclosed herein. In some embodiments, the apparatus may include a pin or other means to receive power. In some embodiments, the apparatus may include power conditioning hardware.

The term "machine readable medium" may include any medium that is capable of storing, encoding, or carrying instructions for execution by the machine 600 and that cause the machine 600 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); and CD-ROM and DVD-ROM disks. In some examples, machine readable media may include non-transitory machine-readable media. In some examples, machine readable media may include machine readable media that is not a transitory propagating signal.

The instructions 624 may further be transmitted or received over a communications network 626 using a transmission medium via the network interface device 620 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, a Long Term Evolution (LTE) family of standards, a Universal Mobile Telecommunications System (UMTS) family of standards, peer-to-peer (P2P) networks, among others.

In an example, the network interface device 620 may include one or more physical jacks (e.g., Ethernet, coaxial, or phone jacks) or one or more antennas to connect to the communications network 626. In an example, the network interface device 620 may include one or more antennas 660 to wirelessly communicate using at least one of single-input multiple-output (SIMO), multiple-input multiple-output (MIMO), or multiple-input single-output (MISO) techniques. In some examples, the network interface device 620 may wirelessly communicate using Multiple User MIMO techniques. The term "transmission medium" shall be taken to include any intangible medium that is capable of storing, encoding or carrying instructions for execution by the machine 600, and includes digital or analog communications signals or other intangible medium to facilitate communication of such software.

Examples, as described herein, may include, or may operate on, logic or a number of components, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

Some embodiments may be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; flash memory, etc.

Figure 7:
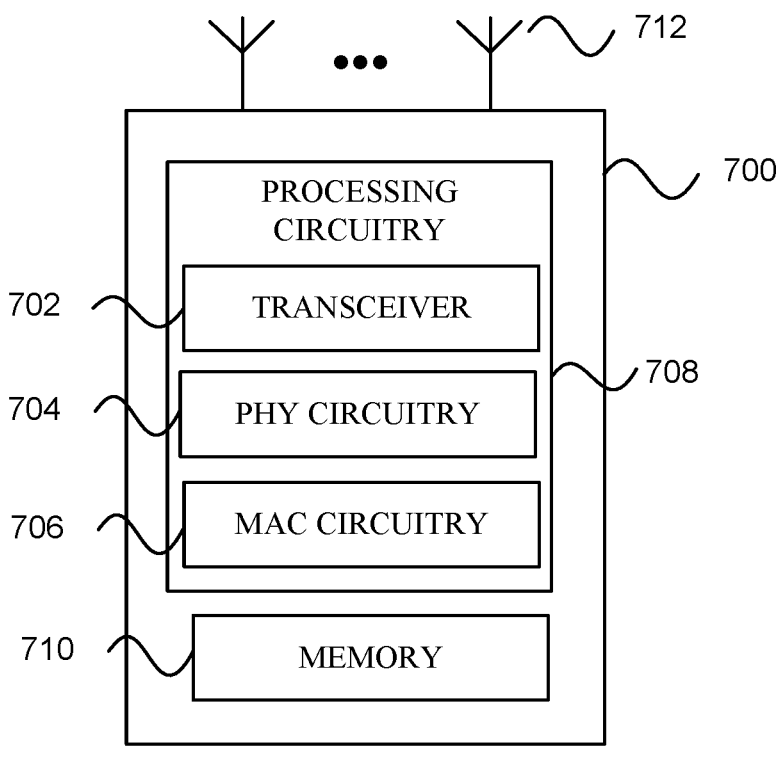
FIG. 7 illustrates a block diagram of an example wireless device upon which any one or more of the techniques (e.g., methodologies or operations) discussed herein may perform.

FIG. 7 illustrates a block diagram of an example wireless device 700 upon which any one or more of the techniques (e.g., methodologies or operations) discussed herein may perform. The wireless device 700 may be a HE device or HE wireless device. The wireless device 700 may be a HE STA 504, HE AP 502, and/or a HE STA or HE AP. A HE STA 504, HE AP 502, and/or a HE AP or HE STA may include some or all of the components shown in FIGS. 1-7. The wireless device 700 may be an example machine 600 as disclosed in conjunction with FIG. 6.

The wireless device 700 may include processing circuitry 708. The processing circuitry 708 may include a transceiver 702, physical layer circuitry (PHY circuitry) 704, and MAC layer circuitry (MAC circuitry) 706, one or more of which may enable transmission and reception of signals to and from other wireless devices 700 (e.g., HE AP 502, HE STA 504, and/or legacy devices 506) using one or more antennas 712. As an example, the PHY circuitry 704 may perform various encoding and decoding functions that may include formation of baseband signals for transmission and decoding of received signals. As another example, the transceiver 702 may perform various transmission and reception functions such as conversion of signals between a baseband range and a Radio Frequency (RF) range.

Accordingly, the PHY circuitry 704 and the transceiver 702 may be separate components or may be part of a combined component, e.g., processing circuitry 708. In addition, some of the described functionality related to transmission and reception of signals may be performed by a combination that may include one, any or all of the PHY circuitry 704 the transceiver 702, MAC circuitry 706, memory 710, and other components or layers. The MAC circuitry 706 may control access to the wireless medium. The wireless device 700 may also include memory 710 arranged to perform the operations described herein, e.g., some of the operations described herein may be performed by instructions stored in the memory 710.

The antennas 712 (some embodiments may include only one antenna) may comprise one or more directional or omnidirectional antennas, including, for example, dipole antennas, monopole antennas, patch antennas, loop antennas, microstrip antennas or other types of antennas suitable for transmission of RF signals. In some multiple-input multiple-output (MIMO) embodiments, the antennas 712 may be effectively separated to take advantage of spatial diversity and the different channel characteristics that may result.

One or more of the memory 710, the transceiver 702, the PHY circuitry 704, the MAC circuitry 706, the antennas 712, and/or the processing circuitry 708 may be coupled with one another. Moreover, although memory 710, the transceiver 702, the PHY circuitry 704, the MAC circuitry 706, the antennas 712 are illustrated as separate components, one or more of memory 710, the transceiver 702, the PHY circuitry 704, the MAC circuitry 706, the antennas 712 may be integrated in an electronic package or chip.

In some embodiments, the wireless device 700 may be a mobile device as described in conjunction with FIG. 6. In some embodiments the wireless device 700 may be configured to operate in accordance with one or more wireless communication standards as described herein (e.g., as described in conjunction with FIGS. 1-6, IEEE 802.11). In some embodiments, the wireless device 700 may include one or more of the components as described in conjunction with FIG. 6 (e.g., display device 610, input device 612, etc.) Although the wireless device 700 is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements may refer to one or more processes operating on one or more processing elements.

In some embodiments, an apparatus of or used by the wireless device 700 may include various components of the wireless device 700 as shown in FIG. 7 and/or components from FIGS. 1-6. Accordingly, techniques and operations described herein that refer to the wireless device 700 may be applicable to an apparatus for a wireless device 700 (e.g., HE AP 502 and/or HE STA 504), in some embodiments. In some embodiments, the wireless device 700 is configured to decode and/or encode signals, packets, and/or frames as described herein, e.g., PPDUs.

In some embodiments, the MAC circuitry 706 may be arranged to contend for a wireless medium during a contention period to receive control of the medium for a HE TXOP and encode or decode an HE PPDU. In some embodiments, the MAC circuitry 706 may be arranged to contend for the wireless medium based on channel contention settings, a transmitting power level, and a clear channel assessment level (e.g., an energy detect level).

The PHY circuitry 704 may be arranged to transmit signals in accordance with one or more communication standards described herein. For example, the PHY circuitry 704 may be configured to transmit a HE PPDU. The PHY circuitry 704 may include circuitry for modulation/demodulation, upconversion/downconversion, filtering, amplification, etc. In some embodiments, the processing circuitry 708 may include one or more processors. The processing circuitry 708 may be configured to perform functions based on instructions being stored in a RAM or ROM, or based on special purpose circuitry. The processing circuitry 708 may include a processor such as a general purpose processor or special purpose processor. The processing circuitry 708 may implement one or more functions associated with antennas 712, the transceiver 702, the PHY circuitry 704, the MAC circuitry 706, and/or the memory 710. In some embodiments, the processing circuitry 708 may be configured to perform one or more of the functions/operations and/or methods described herein.

In mmWave technology, communication between a station (e.g., the HE stations 504 of FIG. 5 or wireless device 700) and an access point (e.g., the HE AP 502 of FIG. 5 or wireless device 700) may use associated effective wireless channels that are highly directionally dependent. To accommodate the directionality, beamforming techniques may be utilized to radiate energy in a certain direction with certain beamwidth to communicate between two devices. The directed propagation concentrates transmitted energy toward a target device in order to compensate for significant energy loss in the channel between the two communicating devices. Using directed transmission may extend the range of the millimeter-wave communication versus utilizing the same transmitted energy in omni-directional propagation.

Figure 8:
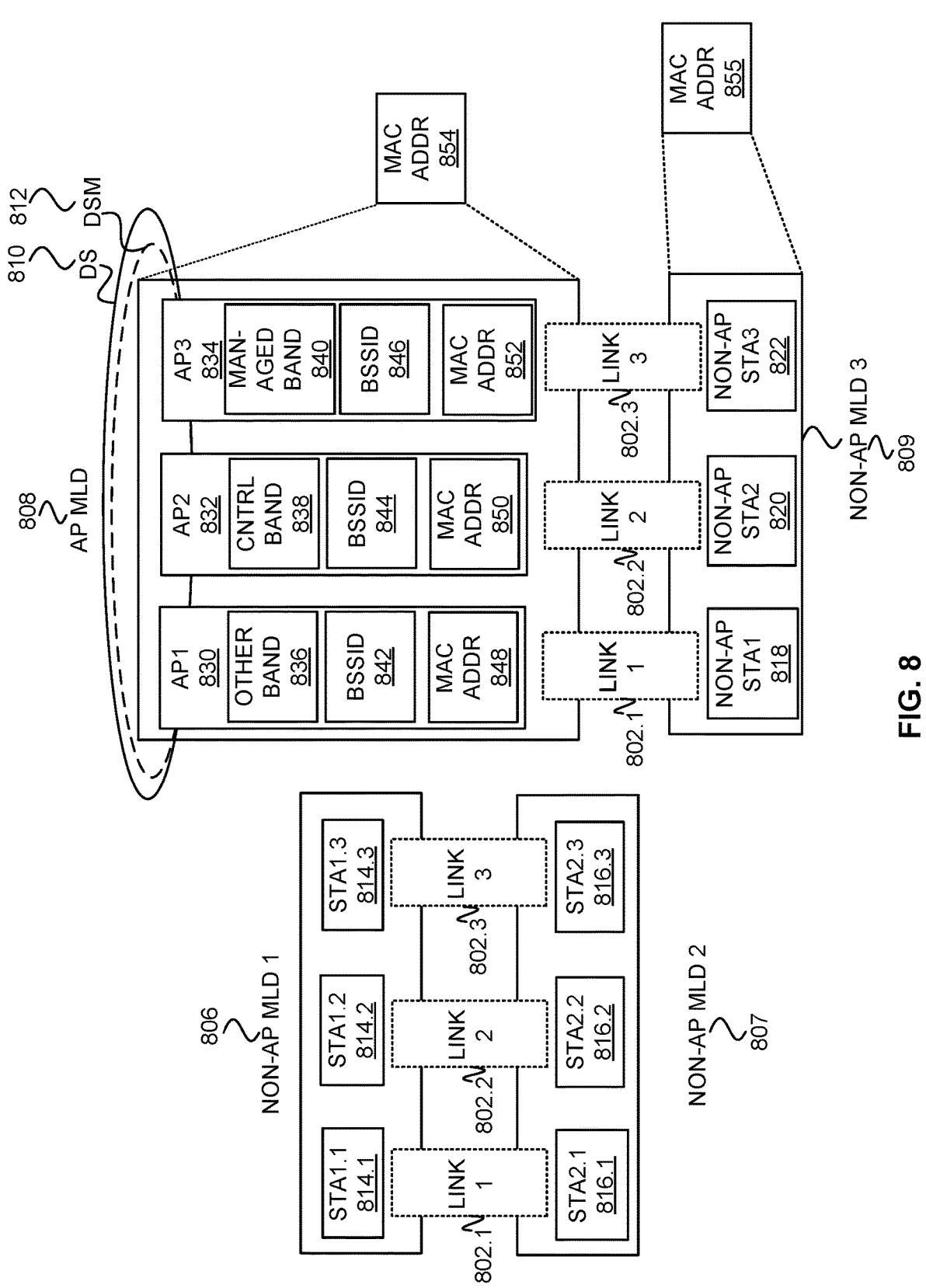
FIG. 8 illustrates multi-link devices (MLDs), in accordance with some embodiments.

FIG. 8 illustrates multi-link devices (MLDs), in accordance with some embodiments. Illustrated in FIG. 8 is ML logical entity 1 or non-AP MLD 1 806, ML logical entity 2 or non-AP MLD 2 807, ML AP logical entity or AP MLD 808, and ML non-AP logical entity or non-AP MLD 3 809. The non-AP MLD 1 806 includes three STAs, STA1.1 814.1, STA1.2 814.2, and STA1.3 814.3 that operate in accordance with link 1 802.1, link 2 802.2, and link 3 802.3, respectively. The Links are described below. Non-AP MLD 2 807 includes STA2.1 816.1, STA2.2 816.2, and STA2.3 816.3 that operate in accordance with link 1 802.1, link 2 802.2, and link 3 802.3, respectively. In some embodiments non-AP MLD 1 806 and non-AP MLD 2 807 operate in accordance with a mesh network. Using three links enables the non-AP MLD 1 806 and non-AP MLD 2 807 to operate using a greater bandwidth and to operate more reliably as they can switch to using a different link if there is interference or if one link is superior due to operating conditions.

The distribution system (DS) 810 indicates how communications are distributed and the DS medium (DSM) 812 indicates the medium that is used for the DS 810, which in this case is the wireless spectrum. AP MLD 808 includes AP1 830, AP2 832, and AP3 834 operating on link 1 802.1, link 2 802.2, and link 3 802.3, respectively. AP MLD 808 includes a MAC address 854 that may be used by applications to transmit and receive data across one or more of AP1 830, AP2 832, and AP3 834.

AP1 830, AP2 832, and AP3 834 include a frequency band, which are other band 836, control (CNTRL) band 838, and managed band 840, respectively. The links 802.1, 802.2, and 802.3 are frequency bands such as 2.4 GHz band, 5 GHz band, 6 GHz band, 7 GHz band, 1-10 GHz, and so forth. The CNTRL band 838 is an unregulated band as described below.

AP1 830, AP2 832, and AP3 834 may operate different BSSIDs, which are BSSID 842, BSSID 844, and BSSID 846, respectively. AP1 830, AP2 832, and AP3 834 include different media access control (MAC) address (addr), which are MAC adder 848, MAC addr 850, and MAC addr 852, respectively. The AP 502 is an AP MLD 808, in accordance with some embodiments. The STA 504 is a non-AP MLD 3 809, in accordance with some embodiments.

The non-AP MLD 3 809 includes non-AP STA1 818, non-AP STA2 820, and non-AP STA3 822. Each of the non-AP STAs have a MAC address (not illustrated) and the non-AP MLD 3 809 has a MAC address 855 that is different and used by application programs where the data traffic is split up among non-AP STA1 818, non-AP STA2 820, and non-AP STA3 822.

The STA 504 is a non-AP STA1 818, non-AP STA2 820, or non-AP STA3 822, in accordance with some embodiments. The non-AP STA1 818, non-AP STA2 820, and non-AP STA3 822 may operate as if they are associated with a BSS of AP1 830, AP2 832, or AP3 834, respectively, over link 1 804.1, link 2 804.2, and link 3 804.3, respectively.

A Multi-link device such as non-AP MLD 1 806 or non-AP MLD 2 807, is a logical entity that contains one or more STAs 814, 816. The non-AP MLD 1 806 and non-AP MLD 2 807 each has one MAC data service interface and primitives to the logical link control (LLC) and a single address associated with the interface, which can be used to communicate on the DSM 812. Multi-link logical entity allows STAs 814, 816 within the multi-link logical entity to have the same MAC address, in accordance with some embodiments. In some embodiments a same MAC address is used for application layers and a different MAC address is used per link 802.

In infrastructure framework, AP MLD 808, includes APs 830, 832, 834, on one side, and non-AP MLD 3 809 includes non-APs STAs 818, 820, 822 on the other side. AP MLD 808 is a ML logical entity, where each STA within the multi-link logical entity is an EHT AP 502, in accordance with some embodiments. Non-AP MLD 1 806, non-AP MLD 2 807, non-AP MLD 809 are multi-link logical entities, where each STA within the multi-link logical entity is a non-AP EHT STA 504. AP1 830, AP2 832, and AP3 834 may be operating on different bands and there may be fewer or more APs. STA1.1 814.1, STA1.2 814.2, and STA1.3 814.3 may be operating on different bands and there may be fewer or more STAs as part of the non-AP MLD 3 809.

In some embodiments, a multi-link device (MLD), 806 or 807, is a device that is a logical entity and has more than one affiliated station (STA), e.g., STAs 814, and has a single medium access control (MAC) service access point (SAP) to logical link control (LLC), which includes one MAC data service.

In some embodiments, a physical layer protocol data unit may be a physical layer conformance procedure (PLCP) protocol data unit (PPDU). In some embodiments, the AP and STAs may communicate in accordance with one of the IEEE 802.11 standards. IEEE Std 802.11-2020 is incorporated herein by reference. IEEE P802.11-REVmd/D2.4, August 2019, and IEEE draft specification IEEE P802.11ax/D5.0, October 2019 are incorporated herein by reference in their entireties. In some embodiments, the AP and STAs may be directional multi-gigabit (DMG) STAs or enhanced DMG (EDMG) STAs configured to communicate in accordance with IEEE 802.11ad standard or IEEE draft specification IEEE P802.11ay, February 2019, which is incorporated herein by reference.

The IEEE 802.11bf (WiFi sensing) group has agreed to the following sequences for sensing:

Trigger-based (TB) sensing: one in which an AP initiates sensing measurement instances with one or more responder non-AP STAs.

Non-trigger based (NTB) sensing: one in which a non-AP STA initiates sensing measurement instance with an associated or unassociated AP.

Responder-to-responder (R2R) sensing: one in which an initiator AP schedules sensing measurement instances between multiple responder non-AP STAs.

Accordingly, the IEEE 802.11bf group has also started to describe the signaling used to convey parameters needed for those procedures. In particular, the group has agreed on the Sensing Measurement Setup Request and Sensing Measurement Setup Response frames to carry a request for sensing measurement setup and the corresponding response from sensing responder. Both these frames would contain a Sensing Measurement Parameters element to contain operational parameters for the sensing measurement instance(s). So far the group has agreed on the following design in FIGS. 9A and 9B for the Sensing Measurement Parameters element:

For a successful sensing measurement setup, the two peer STAs involved in the setup need to know about each other's' MAC and PHY capabilities (e.g., BW, NSS). However, the current Sensing Measurement setup does not describe how to signal those parameters.

Embodiments disclosed herein describe a Sensing Measurement Setup Request and Response frames that contain the following parameters associated with that sensing measurement instance: BW, NSS, LTF Repetition, immediate or delayed feedback report. As described herein, the outcome of a successful sensing measurement setup is referred to as a sensing measurement agreement.

In some embodiments, the Sensing Measurement Setup Request frame contains requested or assigned parameters from a sensing initiator related to the BW, number of STS used and feedback type for the corresponding sensing measurement agreement. In some embodiments, the Sensing Measurement Setup Response frame contains parameters from a sensing responder related to the BW, number of STS used and feedback type for the corresponding sensing measurement agreement. The parameters in the Sensing Measurement Setup Response frame may be assigned parameters, accepted parameters, rejected parameters, or newly proposed parameters, for example.

In some embodiments, the parameters in the Sensing Measurement Request or Response frames may include one or more of the following:

BW: the bandwidth used for this agreement.

Maximum number of LTF repetitions to be used for SI2SR and/or SR2SI NDPs.

Maximum number of space-time streams to be used for SI2SR and SR2SI NDPs.

Maximum number of LTFs to be used in SI2SR and SR2SI NDPs. BSS Color Info

Whether the sensing measurement report sought from the responder is immediate or delayed.

Whether the agreement is for TB or NTB sensing.

If the agreement is for TB sensing:

USID/AID assigned to the sensing initiator.

Trigger frame MAC padding duration: the minimum padding duration in a TF following the User Info addressed to the STA.

Availability Window information

Maximum Measurement Setup Expiry duration

If the agreement is for NTB sensing:

Max Time Between Measurements

Minimum time between measurements.

In some embodiments, the BW information is signaled using a BW field with the following encoding shown in Table 1:

TABLE 1

| Bandwidth field for sensing | |
|---|---|
| Value | Encoding |
| 0 | 20 MHz |
| 1 | 40 MHz |
| 2 | 80 MHz |
| 3 | 160 MHz |
| 4 | 320 MHz |
| 5-7 | Reserved |

In some embodiments, the BW information is signaled using the Format and BW field defined in 11az with new entries added corresponding to EHT 320 MHz operation, shown in Table 2.

TABLE 2

| Format And Bandwidth subfield | | |
|---|---|---|
| Field value | Format | Bandwidth |
| 0 | HE | 20 |
| 1 | HE | 40 |
| 2 | HE | 80 |
| 3 | HE | 80 + 80 |
| 4 | HE (two separate RF Los) | 160 |
| 5 | HE (single RF LO) | 160 |
| 6 | EHT | 320 |
| 7-63 | Reserved | Reserved |

In some embodiments, the BW field signals the exact BW to be used for any sensing measurement instance associated with this agreement. In other words, the initiator shall not attempt any sensing measurement instance if the channel conditions don't permit use of entire BW. For example, if the agreement is for 320 MHz but if the secondary 160 MHz is not available then the initiator does not initiate a instance.

In some embodiments, the BW field signals the maximum BW to be used for any sensing measurement instance associated with this agreement. In other words, the initiator may attempt any sensing measurement instance with lower BW if the channel conditions don't permit use of entire BW. For example, if the agreement is for 320 MHz but if the secondary 160 MHz is not available, then the initiator may initiate frame exchanges with 160 MHz.

In some embodiments, the Maximum number of LTF repetitions parameter is only signaled when the BW for this agreement is <320 MHz.

In some embodiments, the maximum number of LTF repetition in sensing SI2SR NDPs ("Max I2R Repetition") and the maximum number of LTF repetition in sensing SR2SI NDPs ("Max R2I Repetition") are signaled using different fields.

In a Sensing Measurement Setup Request frame the Max I2R Repetition field signals the maximum number of LTF repetitions the initiator is capable of transmitting in a SI2SR NDP.

In a Sensing Measurement Setup Request frame the Max R2I Repetition field signals the maximum number of LTF repetitions the initiator is capable of receiving in a SR2SI NDP.

In a Sensing Measurement Setup Response frame the Max I2R Repetition field signals the maximum number of LTF repetitions the responder assigns to be transmitted in the SI2SR NDP and should not be more than what was signaled in the corresponding Sensing Measurement Setup Request frame if the setup is successful.

In a Sensing Measurement Setup Response frame the Max R2I Repetition field signals the maximum number of LTF repetitions the responder will transmit in the SR2SI NDP and should not be more than what was signaled in the corresponding Sensing Measurement Setup Request frame if the setup is successful.

In some embodiments, the Maximum number of space-time streams parameters used for SI2SR ("Max I2R STS") and SR2SI ("Max R2I STS") NDPs are signaled using separate fields. In some embodiments, in a Sensing Measurement Setup Request frame the Max I2R STS field signals the maximum number of space-time streams the initiator is capable of transmitting in a SI2SR NDP. In some embodiments, in a Sensing Measurement Setup Request frame the Max R2I STS field signals the maximum number of space-time streams the initiator is capable of receiving in a SR2SI NDP. In some embodiments, in a Sensing Measurement Setup Response frame the Max I2R STS field signals the maximum number of space-time streams the responder assigns to be transmitted in the SI2SR NDP and should not be more than what was signaled in the corresponding Sensing Measurement Setup Request frame if the setup is successful. In some embodiments, in a Sensing Measurement Setup Response frame the Max R2I STS field signals the maximum number of space-time streams the responder will transmit in the SR2SI NDP and should not be more than what was signaled in the corresponding Sensing Measurement Setup Request frame if the setup is successful.

In some embodiments, the Maximum number of space-time streams parameters may be signaled for different BW using different fields. For example, instead of having a single Max I2R STS field we could have three fields (similarly for SR2SI NDPs):

Max I2R STS≤80 MHz for signaling maximum number of space-time streams in the SI2SR NDP with BW≤80 MHz.

Max I2R STS=160 MHz for signaling maximum number of space-time streams in the SI2SR NDP with BW=160 MHz.

Max I2R STS>160 MHz for signaling maximum number of space-time streams in the SI2SR NDP with BW>160 MHz.

In some embodiments, the Max R2I STS and Max I2R STS fields defined for 320 MHz may have 4 bits to cover 16 SS. In some embodiments, the Max R2I STS and Max I2R STS fields defined for <320 MHz may have 3 bits to cover 8 SS since for those BW values one will likely use Ranging NDP or TB Ranging NDP for sensing.

In some embodiments, the maximum number of LTFs used for SI2SR ("Max I2R LTF Total") and R2I ("Max R2I LTF Total") NDPs are signaled using separate fields. In some embodiments, in a Sensing Measurement Setup Request frame the Max I2R LTF Total field signals the maximum number of LTFs the initiator is capable of transmitting, including repetitions, in a SI2SR NDP. In some embodiments, in a Sensing Measurement Setup Request frame the Max R2I LTF Total field signals the maximum number of LTFs, including all repetitions, the initiator is capable of receiving in a SR2SI NDP. In some embodiments, in a Sensing Measurement Setup Response frame the Max I2R LTF Total field signals the maximum number of LTFs the responder assigns to be transmitted, including all repetitions, in the SI2SR NDP and should not be more than what was signaled in the corresponding Sensing Measurement Setup Request frame if the setup is successful. In some embodiments, in a Sensing Measurement Setup Response frame the Max R2I LTF Total field signals the maximum number of LTFs the responder will transmit, including all repetitions, in the SR2SI NDP and should not be more than what was signaled in the corresponding Sensing Measurement Setup Request frame if the setup is successful.

In some embodiments, the Max I2R LTF Total and Max R2I LTF Total parameters are signaled using a similar format for all BW. For example, using the encoding used for 11 az as shown in Table 3.

TABLE 3

| Max R2I/I2R LTF Total subfields | |
| --- | --- |
| Field value | Max number of HE/EHT-LTFs |
| 0 | 4 |
| 1 | 8 |
| 2 | 16 |
| 3 | 64 |

Note that since EHT Sounding NDPs are to be used for 320 MHz, the total number of EHT-LTF symbols may be limited to 8.

In some embodiments, the Max I2R LTF Total and Max R2I LTF Total parameters are signaled using the format in Table 3 for BW<320 MHz and HE PPDUs. In some embodiments, the Max I2R LTF Total and Max R2I LTF Total parameters are signaled using the format in Table 4 for BW=320 MHz and/or EHT PPDUs, shown in Table 4.

TABLE 4

| Max R2I/I2R LTF Total subfields for 320 MHz and/or EHT PPDUs | |
| --- | --- |
| Field value | Max number of EHT-LTFs |
| 0 | 1 |
| 1 | 2 |
| 2 | 4 |
| 3 | 6 |
| 4 | 8 |
| Others | Reserved |

Moreover, similar to EHT associated STA case, the Max R2I (or I2R) LTF Total may be limited to twice the corresponding number in Max R2I (or I2R) STS fields and within a specific set (e.g., [2 4 8]).

In some embodiments, if the responder was requested and has agreed to send back measurement report then a bit set to 1 and 0 in the Sensing Measurement Setup Response frame signals whether the responder will send back immediate and delayed reports respectively and is reserved otherwise.

In some embodiments, a field signaling BSS Color Information is present in the Sensing Measurement Setup Response frame and Sensing Measurement Setup Request frame for NTB sensing and TB sensing respectively and may be reserved otherwise. The format of this field could be similar to the BSS Color Information field in the HE Operation element.

In some embodiments, whether the sensing agreement is for TB or NTB is signaled by the presence of a TB-specific or NTB-specific sub-element in the Sensing Measurement Setup Request and Sensing Measurement Setup Response frames respectively.

In some embodiments, whether the sensing agreement is for TB or NTB is signaled by a bit in the Sensing Measurement Setup Request and Sensing Measurement Setup Response frames respectively.

In some embodiments, the USID/AID field is present in the Sensing Measurement Setup Request frame for TB sensing and is either not present or reserved otherwise.

In some embodiments, a field signaling Trigger frame MAC Padding Duration may be present when included in Sensing Measurement Setup Response frame for TB sensing if the sensing responder is also a sensing transmitter and may be reserved otherwise. If present the field may have same encoding as the Trigger Frame MAC Padding Duration field in the HE MAC Capabilities Information field.

In some embodiments, for TB sensing the Maximum Measurement Setup Expiry duration is present in the Sensing Measurement Setup Response frame and may be reserved otherwise. If present, it signals the maximum time before which a measurement exchange should be initiated and may be equal to a maximum inactivity timer after which the agreement is considered to be invalid.

In some embodiments, a Minimum Time between Measurements field may be present in NTB sensing which indicates the minimum time between two NTB sensing measurement instances for this agreement measured in units of TBD (e.g., 100) μs.

In some embodiments, for NTB sensing the Max Time Between Measurements field is present in the Sensing Measurement Setup Request and Response frames. If present, it signals the maximum time before which a measurement exchange should be initiated and may be equal to a maximum inactivity timer after which the agreement is invalid.

In some embodiments, the above sensing operational parameters are signaled in the Sensing Measurement Parameters element or a new element. FIGS. 10A-10D illustrate an example of the design for a Sensing Measurement Parameters element. FIG. 10A illustrates the overall format of a sensing measurement parameters element with a sensing sub-elements field, in accordance with some embodiments. FIG. 10B illustrates a measurement sensing parameters field format of the sensing measurement parameters element with sensing sub-elements, in accordance with some embodiments. FIG. 10C illustrates a non-trigger based (NTB) specific sub-element, in accordance with some embodiments. FIG. 10D illustrates a trigger-based (TB) specific sub-element in accordance with some embodiments.

In some embodiments, the signaling is done inside Ranging Parameters element for <320 MHz and using a new element or modified Sensing Measurement Parameters element for 320 MHz. FIG. 11 shows an example of the Sensing Measurement. Note that if the Ranging Parameters element is included and the BW signaled is <320 MHz, then the 320 MHz specific fields in FIG. 3 are reserved. On the other hand, if there is no Ranging Parameters element included in the Sensing Measurement Setup Request, then this is interpreted as a request to setup a sensing agreement exactly for 320 MHz BW in each corresponding instance.

In some embodiments, the Max I2R Repetition, Max I2R STS and Max I2R LTF total fields are reserved or not present if the sensing responder for this agreement is not a sensing receiver.

In some embodiments, the Max R2I Repetition, Max R2I STS and Max R2I LTF are reserved or not present if the sensing responder for this agreement is not a sensing transmitter.

In some embodiments, the Measurement Setup Query frame contains some of the operational parameters about non-AP STA's capabilities that the AP can account for before sending the Measurement Setup Request frame for TB sensing e.g., BW: the maximum BW the non-AP STA can support.

Maximum number of LTF repetitions, space-time streams, LTFs that it can support as receiver and transmitter for SI2SR and SR2SI NDPs respectively.

Trigger frame MAC padding duration

Device Class

Full BW UL MU-MIMO support.

In some embodiments, the above information may be contained in a new element (e.g., a modified Sensing Capabilities element proposed in 11-22-1385-02-00bf-cc40-sensing-session-part-3.docx).

In some embodiments, the parameters described above when included for Responder-to-Responder (R2R) signaling setup applies with the understanding that the SI2SR NDP is not a TB Ranging NDP but a HE Ranging NDP.

Some embodiments are directed to station (STA) (STA-1) configured for wireless local area network (WLAN) sensing. The STA may be either a access point station (AP STA) or a non-AP STA). In these embodiments, for establishment of a sensing measurement agreement with another STA STA-2, the STA may be configured to perform a sensing measurement setup with the other STA. In these embodiments, the sensing measurement setup may comprise an exchange of sensing measurement request and response frames to establish sensing measurement parameters associated with a sensing measurement instance.

In these embodiments, upon successful establishment of the sensing measurement agreement, the STA may perform sensing measurements with the other STA by transmitting and receiving null-data packets (NDPs) for the sensing measurement instance, the NDPs configured in accordance with the sensing measurement agreement.

In some embodiments, the sensing measurements comprise measuring channel variation based on channel state information (CSI). Unlike conventional ranging, a STA performing WLAN sensing measures channel variation, not distance, which may be based on channel state information (CSI) between TX-RX antenna pairs. These embodiments are discussed in more detail below.

In some embodiments, when the STA operates as a sensing initiator for establishment of the sensing measurement agreement, the STA may be configured to encode a Sensing Measurement Setup Request frame for transmission to the other STA. The Sensing Measurement Setup Request frame may be encoded to include sensing measurement parameters for the sensing measurement agreement. In these embodiments, the STA may decode a Sensing Measurement Setup Response frame received from the other STA in response to transmission of the Sensing Measurement Setup Request frame. The Sensing Measurement Setup Response frame may indicate acceptance of at least some of the parameters assigned for the sensing measurement agreement.

In some embodiments, the STA may be configured to determine the sensing measurement parameters based on receipt of a measurement setup query frame received from the other STA that includes a sensing capabilities element that indicates sensing measurement capabilities of the other STA.

In some embodiments, the Sensing Measurement Setup Request frame and the Sensing Measurement Setup Response frame may be configurable to include a variable length Measurement Sensing Parameters field (see FIG. 10A) and a sensing sub-elements field. In these embodiments, the Measurement Sensing Parameters field may be configured to include one or more of the sensing measurement parameters. In these embodiments, the sensing measurement parameters may comprise one or more of a bandwidth (BW) field, one or more fields for a number of space-time streams (STS) and a number of long-training field (LTF) and LTF repetitions that the STA is capable of transmitting and receiving, and an immediate or delayed feedback reporting field.

In some embodiments, the Measurement Sensing Parameters field (see FIG. 10B) may include fields to identify a sensing transmitter and a sensing receiver, a sensing measurement report requested field, a sensing measurement report type field and the bandwidth field. In these embodiments, the STA-1 may send a Measurement Setup Request frame assigning at least some parameters to the STA-2 for the sensing measurement agreement. In response, the STA-2 may send a Measurement Setup Response frame either accepting the assignment and including no Sensing Measurement Parameter element in the frame or rejecting the assignment and optionally include alternate and/or recommended parameters in a Sensing Measurement Parameters element in the frame. In these embodiments, prior to the exchange of frames and this sensing measurement setup negotiation, during discovery or in a Sensing Measurement Query frame, the STA-2 may signal its capability parameters to STA-1 to allow STA-1 to select the sensing measurement parameters for the sensing measurement agreement. In some embodiments, the STAs may determine a common availability period for performing the sensing measurements.

In some embodiments, the sensing sub-elements field may be configurable to include a sub-element indicating whether the sensing measurement agreement is for non-trigger based (NTB) sensing or is for trigger based (TB) sensing. In some embodiments, for TB sensing, an AP may initiate the measurement setup by sending the measurement setup request frame. In these embodiments, for NTB sensing, on the other hand, a non-AP STA may initiate measurement setup with the AP. FIG. 10C and FIG. 10D illustrate examples of NTB and TB specific sub-elements.

In some embodiments, for trigger based sensing, the Sensing Measurement Setup Request frame and the Sensing Measurement Setup Response frame may be configurable to include one or more of: an identify (e.g., an USID/AID) assigned to the sensing initiator, a Trigger frame MAC padding duration, Availability Window information, and a Maximum Measurement Setup Expiry duration. In these embodiments, for non-trigger based sensing, the Sensing Measurement Setup Request frame and the Sensing Measurement Setup Response frame are configurable to include one or more of: a Maximum Time Between sensing Measurements, and a Minimum time between sensing measurements. See for example, FIG. 10B which illustrates a measurement sensing parameters field format of the sensing measurement parameters element with sensing sub-elements, in accordance with some embodiments. See FIG. 10C, which illustrates a non-trigger based (NTB) specific sub-element, in accordance with some embodiments.

In some embodiments, the bandwidth field may be a subfield that is configurable to include a value indicating a maximum supported bandwidth to be used for the sensing measurement agreement. In these embodiments, the value may indicate a bandwidth comprising one of 20 MHz, 40 MHz, 80 MHz, 160 MHz, and 320 MHz. FIG. 11, for example, illustrates a sensing measurement parameters field format to signal operational parameters for 320 MHz using a sensing measurement parameters element in accordance with some embodiments.

In some embodiments, the Sensing Measurement Setup Request frame and the Sensing Measurement Setup Response frame may be configurable to include a sensing element or sub-element that indicates one or more of parameters for the sensing measurement instance that are within previously exchanged STA capabilities. In some embodiments, the Sensing Measurement Setup Request frame and the Sensing Measurement Setup Response frame are configurable to include a sensing element or sub-element that indicates one or more capability parameters. For example, a non-AP STA may send a separate Mgt frame (e.g., a Sensing Measurement Setup query or an Association Request) containing a sensing element that signals that the non-AP STA is capable of supporting 160 MHz. However, during NTB measurement setup, the non-AP STA may send a Measurement Setup Request frame that signals its willing to setup measurement instances with 80 MHz even though its capable of 160 MHz.

In some other embodiments, at least some of the capability parameters may get exchanged before the measurement setup request/response exchange. In these other embodiments, some parameters (e.g., BW, LTF rep, # of STS) may be exchanged prior to measurement setup request/response exchange and are requested to be used for the sensing measurement instance. These parameters may be within the set of capability parameters already signaled by the STA.

In these embodiments, the capability parameters may include one or more of:

a maximum supported bandwidth in a bandwidth subfield.

Maximum number of LTF repetitions the STA is capable of receiving in a preamble of a SR2SI or SI2SR NDP that is either a HE Ranging NDP or a HE TB Ranging NDP, in the Max Rx Repetition subfield.

Maximum number of LTF repetitions it is capable of transmitting in the preamble of the SR2SI or SI2SR NDP that is a HE Ranging NDP or a HE TB Ranging NDP, in the Max Tx Repetition subfield.

Maximum number of space-time streams it is capable of receiving in a SR2SI or SI2SR NDP for bandwidths less than or equal to 80 MHz, in the Max Rx STS≤80 MHz subfield.

Maximum number of space-time streams it is capable of receiving in a SR2SI or SI2SR NDP for bandwidth equal to 160 MHz, in the Max Rx STS=160 MHz subfield.

Maximum number of space-time streams it is capable of receiving in a SR2SI or SI2SR NDP for bandwidth equal to 320 MHz, in the Max Rx STS=320 MHz subfield.

Maximum number of space-time streams it is capable of transmitting in the SI2SR NDP for bandwidths less than or equal to 80 MHz, in the Max Tx STS≤80 MHz subfield.

Maximum number of space-time streams it is capable of transmitting in a SR2SI or SI2SR NDP for bandwidth equal to 160 MHz, in the Max Tx STS=160 MHz subfield.

Maximum number of space-time streams it is capable of transmitting in a SR2SI or SI2SR NDP for bandwidth equal to 320 MHz, in the Max Tx STS=320 MHz subfield.

Maximum number of HE-LTFs in total it is capable of receiving, including all repetitions, in a SR2SI or SI2SR NDP that is either a HE Ranging NDP or a HE TB Ranging NDP, in the Max Rx HE-LTF Total subfield.

Maximum number of EHT-LTFs in total it is capable of receiving, including all repetitions, in a SR2SI or SI2SR NDP that is a EHT sounding NDP, in the Max Rx EHT-LTF Total subfield.

Maximum number of HE-LTFs in total it is capable of transmitting, including all repetitions, in a SR2SI or SI2SR NDP that is a HE Ranging NDP, in the Max Tx HE-LTF Total subfield.

In some embodiments, the sensing measurements performed in accordance with the sensing measurement agreement include channel measurements (e.g., CSI) based on the LTFs. In these WLAN sensing embodiments, the STA may be configured to estimate features such as range, velocity, and motion of objects, other than the STAs performing the sensing measurements, in an area of interest based on the channel measurements. In these embodiments, WLAN sensing may be used to estimate features such as range, velocity, and motion of objects in an area of interest based on sensing measurements of the channel between an AP and one or more non-AP STAs. WLAN sensing enables motion detection, gesture recognition as well as biometric measurements of object by using WLAN signals. The objects are different from the STAs that are performing sensing. This is unlike conventional ranging which may be used determine a distance between wireless devices and determine a location of wireless devices based on signals transmitted by those devices performing ranging. WLAN sensing is currently being addressed in by the IEEE in draft standard IEEE P802.11bf™/D0.2, July 2022.

Ranging, for example, uses NDPs to measure a time-of-flight from which a distance to another STA may be computed. Hence in ranging, a STA needs to report back accurate ToA, ToD etc. In WLAN sensing on the other hand, NDPs are used to measure variation in channel and so a STA reports back CSI between TX-RX antenna pairs. Unlike WLAN sensing, the ranging protocol needs to signal both TX and RX parameters since an initiator/responder needs to both send an NDP and receive an NDP in every instance. In WLAN sensing, there is no such requirement (i.e., a STA can either send an NDP or receive an NDP or both during negotiated measurement instances). Furthermore, unlike WLAN sensing, ranging parameters are defined for <320 MHz bandwidth.

Some embodiments are directed to a non-transitory computer-readable storage medium that stores instructions for execution by processing circuitry of a station (STA) STA-1 configured for wireless local area network (WLAN) sensing. For establishment of a sensing measurement agreement with another STA STA-2, the processing circuitry may be configured to perform a sensing measurement setup with the other STA and perform sensing measurements with the other STA by transmitting and receiving null-data packets (NDPs) for the sensing measurement instance. In these embodiments, the NDPs may be configured in accordance with the sensing measurement agreement.

FIG. 12 illustrates a procedure for establishment of a sensing measurement agreement with another STA, in accordance with some embodiments. Procedure 1200 may be performed by processing circuitry of a STA. Operation 1202 comprises performing a sensing measurement setup with the other STA comprising an exchange of sensing measurement request and response frames to establish sensing measurement parameters associated with a sensing measurement instance.

Operation 1204 comprises, upon successful establishment of the sensing measurement agreement, performing sensing measurements with the other STA by transmitting and receiving null-data packets (NDPs) for the sensing measurement instance.

Operation 1206 comprises configuring the NDPs in accordance with the sensing measurement agreement.

Operation 1208 comprises measuring channel variation based on channel state information (CSI). In these embodiments, the sensing measurements performed in accordance with the sensing measurement agreement include channel measurements [e.g., CSI] based on the LTFs. In these embodiments, the procedure may also include estimating features of objects, other than the STAs performing the sensing measurements, in an area of interest based on the channel measurements.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. An apparatus of a station (STA) configured for wireless local area network (WLAN) sensing, the apparatus comprising: processing circuitry; and memory, the processing circuitry to configure the STA to:

exchange sensing measurement request and response frames to establish operational parameters for one or more sensing measurement exchanges of a sensing measurement session;

perform the one or more sensing measurement exchanges, the one or more sensing measurement exchanges comprising null-data packet (NDP) transmissions and NDP receptions, the NDP transmissions and NDP receptions comprising NDPs configured in accordance with the operation parameters established for the sensing measurement session; and estimate features of objects in an area of interest based on sensing measurements obtained during the one or more sensing measurement exchanges.

2. The apparatus of claim 1, wherein the sensing measurements comprise measurements of channel state information (CSI), and wherein the processing circuitry is configured to decode one or more sensing measurement reports comprising an indication of variation of the CSI.

3. The apparatus of claim 2, wherein in response to the STA operating as a sensing initiator in the sensing measurement session, the processing circuitry is configured to:

encode a Sensing Measurement Request frame for transmission to other STA operating as a sensing responder, the Sensing Measurement Request frame encoded to include requested sensing measurement session parameters for the one or more sensing measurement exchanges of the sensing measurement session; and decode a Sensing Measurement Response frame received from the other STA in response to transmission of the Sensing Measurement Request frame, wherein the Sensing Measurement Response frame indicates SUCCESS in response to the sensing responder accepting the requested sensing measurement session parameters.

4. The apparatus of claim 3, wherein the Sensing Measurement Response frame indicates a rejection with suggested changes in response to the sensing responder declining the requested sensing measurement session parameters and includes proposed sensing measurement session parameters in the Sensing Measurement Response frame.

5. The apparatus of claim 4, wherein the Sensing Measurement Response frame indicates a rejection in response to the sensing responder declining the requested sensing measurement session parameters without including proposed sensing measurement session parameters in the Sensing Measurement Response frame.

6. The apparatus of claim 5, wherein to exchange sensing capabilities, the processing circuitry is configured to decode a sensing capabilities element received from the other STA, the sensing capabilities element including sensing capabilities of the other STA, wherein in response to the other STA being an unassociated STA, the sensing capabilities element is received in a sensing measurement query frame, and wherein in response to the other STA being an associated STA, the sensing capabilities element is received in an association request frame.

7. The apparatus of claim 6, wherein the processing circuitry is configured to encode the Sensing Measurement Request frame to include a Sensing Measurement Parameters Element to indicate the requested sensing measurement session parameters for the one or more sensing measurement exchanges of the sensing measurement session, the Sensing Measurement Parameters Element to include a Sensing Measurement Parameters field and a Sensing Subelements field, wherein the Sensing Measurement Sensing Parameters field is encoded to include a bandwidth (BW) field, one or more fields for a number of space-time streams (STS), one or more fields for a number of long-training field (LTF) repetitions, and a measurement session expiry field that indicates a time that the sensing measurement session is terminated.

8. The apparatus of claim 7, wherein the Sensing Subelements field is encoded to include a sub-element indicating whether one or more of the sensing measurement exchanges of the sensing measurement session is for a non-trigger based (non-TB) sensing measurement exchange or is for a trigger based (TB) sensing measurement exchange, wherein for the TB sensing measurement exchange, the Sensing Subelements field is encoded to include at least an identify assigned to the sensing responder and an Availability Window field, and wherein for the non-TB sensing measurement exchange, the Sensing Subelements field is encoded to include at least a minimum time between non-TB measurement exchanges in units of 100 microseconds.

9. The apparatus of claim 8, wherein the bandwidth field is encoded to indicate a requested bandwidth to be used for the NDPs of the NDP transmissions and NDP receptions comprising NDPs for one or more sensing measurement exchanges of the sensing measurement session.

10. The apparatus of claim 9, wherein the bandwidth field encoded to indicate one of 20 MHz, 40 MHz, 80 MHZ, 160 MHZ, and 320 MHz.

11. A non-transitory computer-readable storage medium that stores instructions for execution by processing circuitry of a station (STA) configured for wireless local area network (WLAN) sensing, the processing circuitry to configure the STA to:

exchange sensing measurement request and response frames to establish operational parameters for one or more sensing measurement exchanges of a sensing measurement session;

perform the one or more of sensing measurement exchanges, the one or more sensing measurement exchanges comprising null-data packet (NDP) transmissions and NDP receptions, the NDP transmissions and NDP receptions comprising NDPs configured in accordance with the operation parameters established for the sensing measurement session; and estimate features of objects in an area of interest based on sensing measurements obtained during the one or more sensing measurement exchanges.

12. The non-transitory computer-readable storage medium of claim 11, wherein the sensing measurements comprise measurements of channel state information (CSI), and wherein the processing circuitry is configured to decode one or more sensing measurement reports comprising an indication of variation of the CSI.

13. The non-transitory computer-readable storage medium of claim 12, wherein in response to the STA operating as a sensing initiator in the sensing measurement session, the processing circuitry is configured to:

encode a Sensing Measurement Request frame for transmission to other STA operating as a sensing responder, the Sensing Measurement Request frame encoded to include requested sensing measurement session parameters for the one or more sensing measurement exchanges of the sensing measurement session; and decode a Sensing Measurement Response frame received from the other STA in response to transmission of the Sensing Measurement Request frame, wherein the Sensing Measurement Response frame indicates SUCCESS in response to the sensing responder accepts accepting the requested sensing measurement session parameters.

14. The non-transitory computer-readable storage medium of claim 13, wherein the Sensing Measurement Response frame indicates a rejection with suggested changes in response to the sensing responder declining the requested sensing measurement session parameters for the one or more sensing measurement exchanges and includes proposed sensing measurement session parameters for the one or more sensing measurement exchanges in the Sensing Measurement Response frame.

15. The non-transitory computer-readable storage medium of claim 14, wherein the Sensing Measurement Response frame indicates a rejection in response to the sensing responder not accepting the requested sensing measurement session parameters without including proposed sensing measurement session parameters in the Sensing Measurement Response frame.

16. The non-transitory computer-readable storage medium of claim 15, wherein to exchange sensing capabilities, the processing circuitry is configured to decode a sensing capabilities element received from the other STA, the sensing capabilities element including sensing capabilities of the other STA, wherein in response to the other STA being an unassociated STA, the sensing capabilities element is received in a sensing measurement query frame, and wherein in response to the other STA being an associated STA, the sensing capabilities element is received in an association request frame.

17. The non-transitory computer-readable storage medium of claim 16, wherein the processing circuitry is configured to encode the Sensing Measurement Request frame to include a Sensing Measurement Parameters Element to indicate the requested sensing measurement session parameters for the one or more sensing measurement exchanges of the sensing measurement session,

the Sensing Measurement Parameters Element to includes a Sensing Measurement Parameters field and a Sensing Subelements field, wherein the Sensing Measurement Sensing Parameters field is encoded to include a bandwidth (BW) field, one or more fields for a number of space-time streams (STS), one or more fields for a number of long-training field (LTF) repetitions, and a measurement session expiry field that indicates a time that the sensing measurement session is terminated.

18. The non-transitory computer-readable storage medium of claim 17, wherein the Sensing Subelements field is encoded to include a sub-element indicating whether one or more of the sensing measurement exchanges of the sensing measurement session is for a non-trigger based (non-TB) sensing measurement exchange or is for a trigger based (TB) sensing measurement exchange, wherein for the TB sensing measurement exchange, the Sensing Subelements field is encoded to include at least an identify assigned to the sensing responder and an Availability Window field, and wherein for the non-TB sensing measurement exchange, the Sensing Subelements field is encoded to include at least a minimum time between non-TB measurement exchanges in units of 100 microseconds.

19. A method performed by processing circuitry of a station (STA) configured for wireless local area network (WLAN) sensing, the method comprising:

exchanging sensing measurement request and response frames to establish operational parameters for one or more sensing measurement exchanges of a sensing measurement session;

performing the one or more of sensing measurement exchanges, the one or more sensing measurement exchanges comprising null-data packet (NDP) transmissions and NDP receptions, the NDP transmissions and NDP receptions comprising NDPs configured in accordance with the operation parameters established for the sensing measurement session; and estimating features of objects in an area of interest based on sensing measurements obtained during the one or more sensing measurement exchanges.

20. The method of claim 19, wherein the sensing measurements comprise measurements of channel state information (CSI), and wherein method further comprises decoding one or more sensing measurement reports comprising an indication of variation of the CSI.

\* \* \* \* \*